United States Patent
Kato et al.

(10) Patent No.: US 6,681,294 B1
(45) Date of Patent: Jan. 20, 2004

(54) CACHE CONTROL APPARATUS FOR A MICROPROCESSOR

(75) Inventors: Shinya Kato, Kawasaki (JP); Toshiyuki Muta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,354

(22) Filed: Mar. 29, 2000

(30) Foreign Application Priority Data

Sep. 2, 1999 (JP) .......................................... 11-248569

(51) Int. Cl.[7] ................................................ G06F 12/08
(52) U.S. Cl. ....................................... 711/128; 711/145
(58) Field of Search ................................. 711/128, 118, 711/119, 145, 200, 204, 208

(56) References Cited

U.S. PATENT DOCUMENTS

| | | | | |
|---|---|---|---|---|
| 5,835,951 A | * | 11/1998 | McMahan | 711/145 |
| 5,845,323 A | * | 12/1998 | Roberts et al. | 711/128 |
| 5,875,464 A | * | 2/1999 | Kirk | 711/129 |
| 5,916,314 A | * | 6/1999 | Berg et al. | 714/54 |
| 5,946,718 A | * | 8/1999 | Green | 711/207 |
| 5,970,509 A | * | 10/1999 | Green | 711/128 |
| 5,974,509 A | * | 10/1999 | Berliner | 711/135 |
| 6,026,470 A | * | 2/2000 | Arimilli et al. | 711/128 |
| 6,088,825 A | * | 7/2000 | Ikushima et al. | 714/769 |
| 6,247,094 B1 | * | 6/2001 | Kumar et al. | 711/3 |
| 6,338,118 B2 | * | 1/2002 | Johnson | 711/128 |
| 6,425,055 B1 | * | 7/2002 | Sager et al. | 711/118 |

* cited by examiner

*Primary Examiner*—Pierre-Michel Bataille
(74) *Attorney, Agent, or Firm*—Staas & Halsey LLP

(57) ABSTRACT

A cache control apparatus for an information processing system having a cache memory with a plurality of ways is disclosed, in which the hardware amount is reduced and the delay of the response time is minimized. At the time of cache access, each way is indexed by time division, and when updating the cache, a way to be updated is designated thereby to update the cache tag and the cache data. The data indexed by time division can be judged for a hit each time of indexing or alternatively, the data of all the ways are judged for a hit after being held in a buffer. The data indexed by time division is sent to the reader as response without regard to the way, and when a miss is judged, a cancel signal is sent thereby to minimize the access time delay. Further by predicting the address of a way, the access time can be further improved.

11 Claims, 30 Drawing Sheets

CACHE CONTROL APPARATUS FOR A MICROPROCESSOR

BACKGROUND OF THE INVENTION

1. Field of the Invention

The present invention relates to a cache control apparatus for a microprocessor.

2. Description of the Related Art

With the trend of semiconductor technologies toward miniaturization, higher frequencies and higher degree of integration, the performances of microprocessors have remarkably improved. To make the most of the performance of the microprocessor in this situation, a high-speed cache, with large capacity and a high hit ratio is required.

A conventional cache control apparatus generally has a hierarchical structure with a small-capacity cache built in the processor and a large-capacity cache attached as an external unit. Also, with the built-in cache, optimization by the copy-back method is used with the aim of providing an improved hit ratio by using multiple ways (circuit path).

In the future, a higher hit ratio of the external cache will come to be required. For improving the hit ratio, it is effective to increase ways number. The direct map system in which the number of ways is regarded to be unity, on the other hand, has simple hardware and a high access speed.

The external cache is configured.with a combination of a RAM on a CPU module. The simple fabrication of multiple ways, therefore, requires more address lines, data lines and control lines.than the system with fewer ways, and makes the pattern design of the module difficult. The increased number of-pins of the processor is also a serious problem. Further, the access time cannot be guaranteed and, in the case where prediction fails, a delay results.

SUMMARY OF THE INVENTION

An object of the present invention is to provide a cache control apparatus for an information processing system comprising a cache memory having a plurality of ways, which can have multiple ways without increasing the hardware amount.

Another object of the invention is to provide a cache control apparatus for an information processing system having a cache memory having a plurality of ways, in which high-speed access can be guaranteed and, in the case where the last way is hit or even in the case of a cache miss, a response is made possible with minimum delay.

The present invention has been developed to achieve the objects described above.

According to the present invention, there is provided a cache control apparatus for an information processing system comprising a cache memory having a plurality of ways, in which a cache tag memory and a cache data memory are indexed with the cache index and a way as an address and, at the time of cache access, each way is indexed by time division while, at the time of updating the cache tag or cache data, the way to be updated is designated for updating the cache tag and the cache data, the apparatus further comprising a buffer for recording for each way the data of the cache tag indexed by time division, means for holding the cache tag data of all the ways until they are completely acquired, and means for making a hit judgment for all the ways at the same time.

According to this invention, a hit judging unit can judge a hit or not each time the cache tag data is indexed by time division.

According to this invention, the data are read by time division at the time of indexing the cache tag or the cache data, and therefore the hardware amount can be reduced.

Also, the apparatus according to this invention can comprise means for always responding to the reader with the cache data in a fixed way and means for producing a cancel signal in the case of a cache miss in a fixed way and responding with the data of another way which may be hit. According to this invention, the cache is indexed by time division, and the indexed data are sequentially transferred to the reader. In the case where the previously sent data is a cache miss, a cancel signal is output and a response signal is sent for the data in a way hit. Thus, even for multiple ways, the access time delay can be minimized.

The apparatus according to this invention can further comprise means for recording the history of the hit ways, means for predicting from the history a way which may be hit, and means for responding with the cache data in the predicted way, wherein the responding means can include means, in the case of a cache miss in the predicted way, for responding again with the data of a particular way. According to this invention, a way with high probability of a hit is predicted and the tag is indexed, and therefore the access time can be reduced.

The present invention is also applicable to the internal cache as well as to the external cache.

BRIEF DESCRIPTION OF THE DRAWINGS

The above object and features of the present invention will be more apparent from the following description of the preferred embodiment with reference to the accompanying drawings, wherein.

DESCRIPTION OF THE PREFERRED EMBODIMENTS

Embodiments of the present invention will be explained with reference to the drawings.

Figure 1:
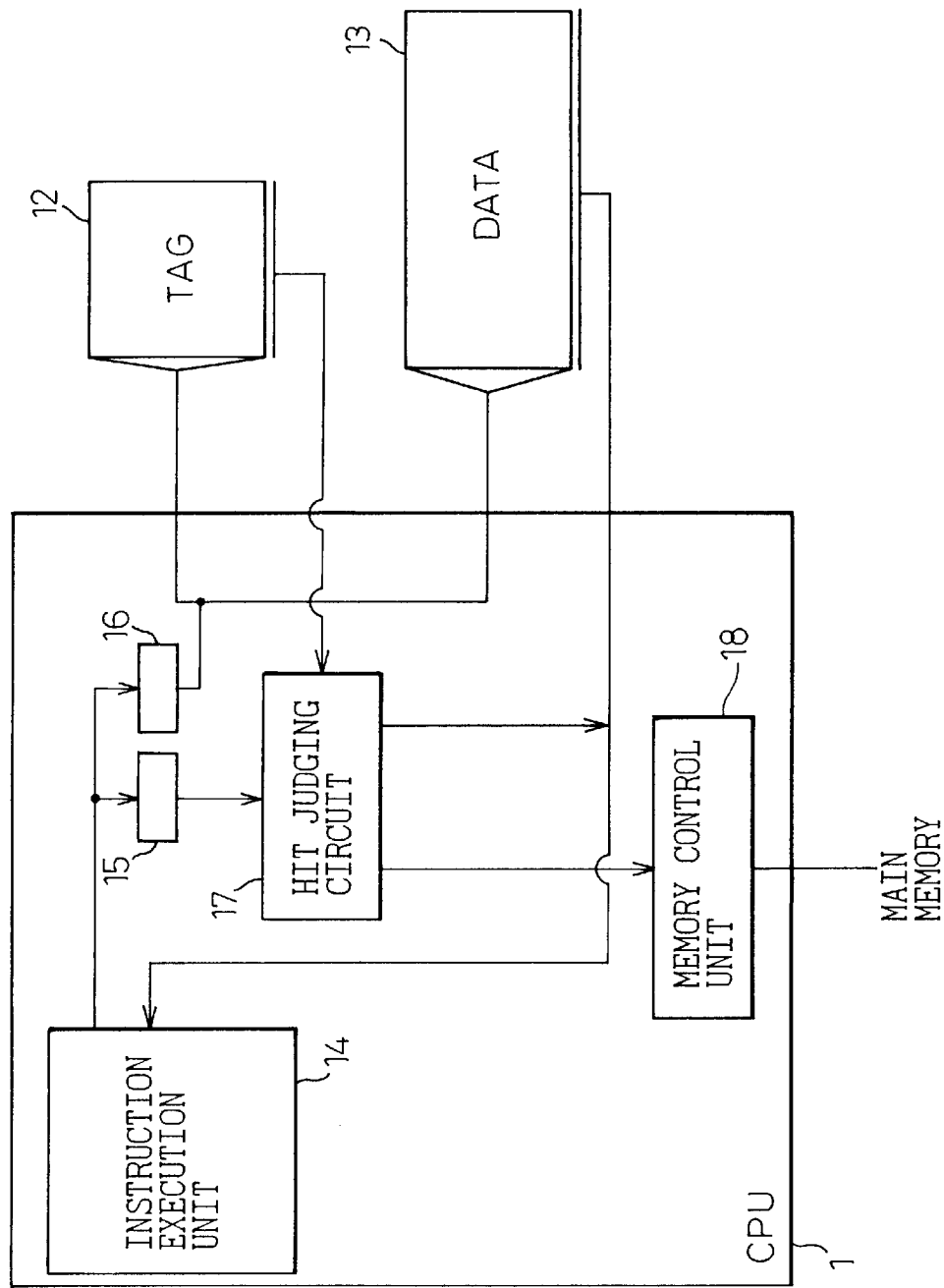
FIG. 1 shows a configuration of an external cache used with a cache control apparatus according to this invention.

FIG. 1 is a diagram schematically showing an external cache.

In FIG. 1, external cache memories including an external cache tag memory 12 and an external cache data memory 13 outside of a CPU 11 (the external cache tag memory will hereinafter be called simply a tag memory, and the external cache data memory simply a data memory) are arranged outside the CPU 11.

In response to instruction addresses 15, 16 output by an instruction execution unit 14 in the CPU 11, a part 16 of the instruction addresses is input to the tag memory 12 and the data memory 13 so that the tag is indexed in the tag memory 12. A hit judging unit 17 judges whether the indexed tag is hit or not. In the case where the judgment is a hit, the data is read from the data memory 13, and output to the instruction execution unit 14 of the reader. In the case where the judgment is a cache miss, on the other hand, the instruction is read from the main memory under the control of the memory control unit 18 thereby to update the cache and write into the instruction execution unit 14.

Figure 2:
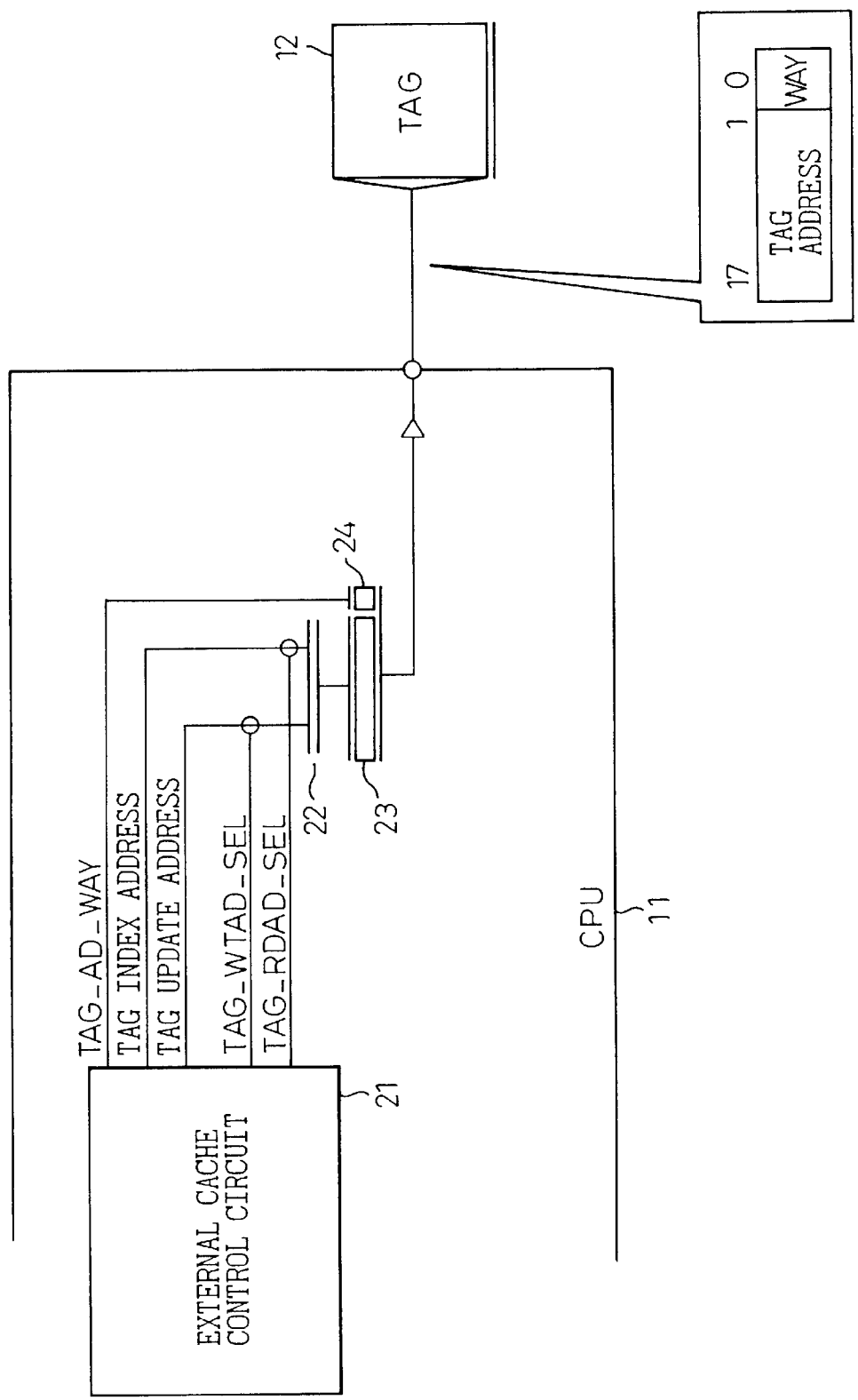
FIG. 2 shows a configuration of a circuit for indexing and updating a tag memory of a cache control apparatus according to the invention.
Figure 3:
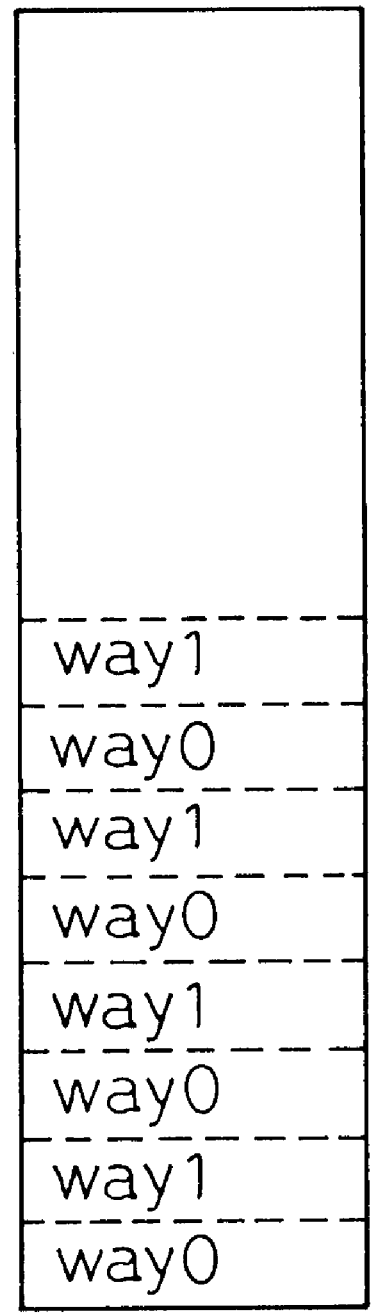
FIG. 3 shows an address mapping of the memory in FIG. 2.
Figure 4:
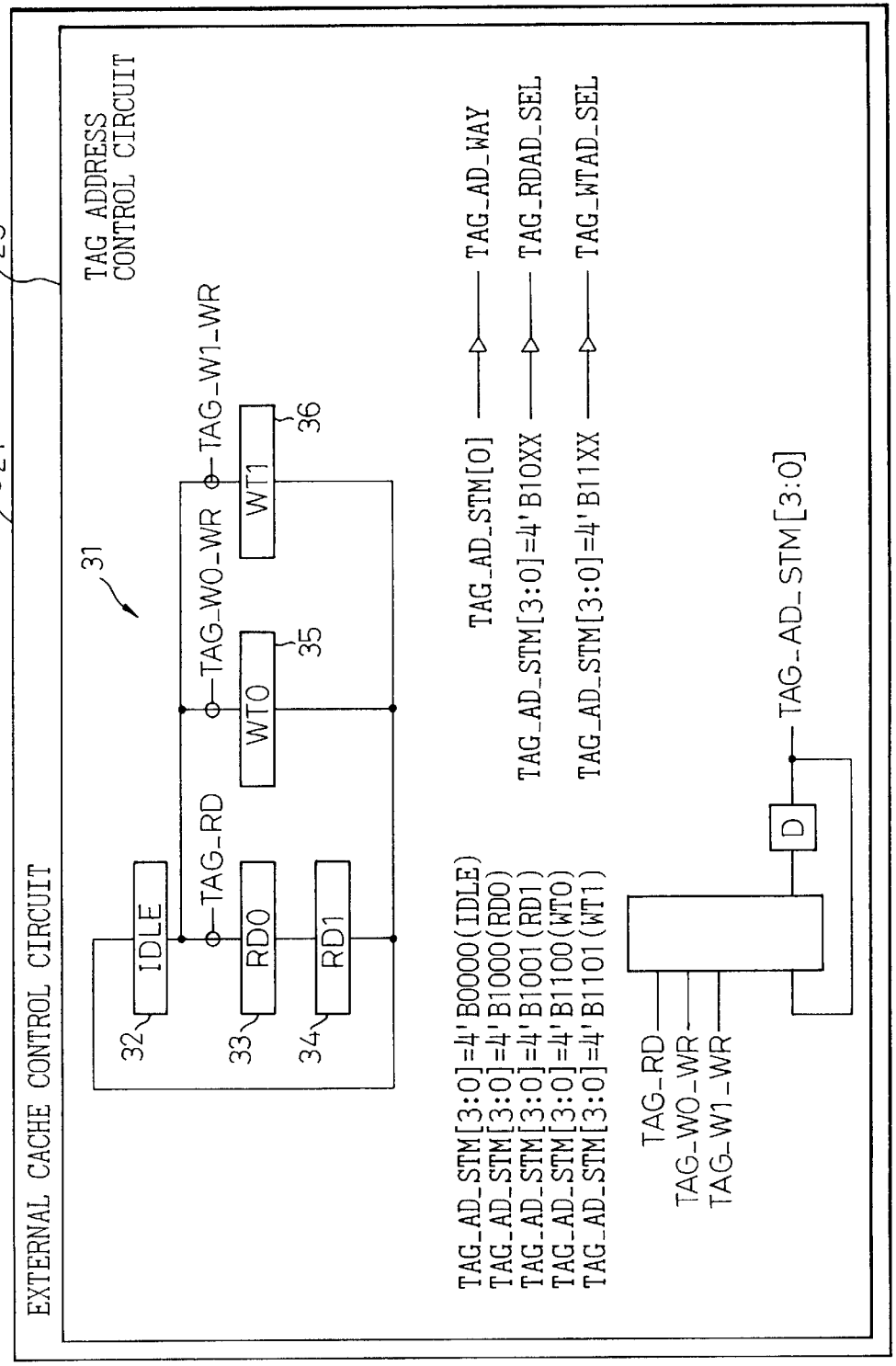
FIG. 4 shows a configuration of an external cache control circuit in FIG. 2.

With reference to FIGS. 2 to 4, a configuration for indexing and updating the tag memory 12 will be explained. FIG. 2 shows a configuration of the circuit for indexing and updating the tag memory 12. FIG. 3 shows an address mapping of the tag memory 12. FIG. 4 shows a configuration of the external cache control circuit 21.

In the example shown below, the number of ways is assumed to be two (WAY 0 and WAY 1), although the number of ways is not necessarily limited to two.

In FIG. 2, the external cache control circuit 21 outputs a tag index address signal or a tag update address signal and a tag address way signal (TAG_AD_WAY), and further outputs a tag read address select signal (TAG_RDAD_SEL) and a tag write address select signal (TAG_WTAD_SEL).

A switch 22 selects the tag index address signal or the tag update address signal in response to the tag read address select signal (TAG_RDAD_SEL) or the tag write address select signal (TAG_WTAD_SEL), respectively. The selected signal is input to an address register 23.

The tag address way signal (TAG_AD_WAY) output by the external cache control circuit 21 is input directly to a way designation register 24.

The address connected to the tag memory 12 combines the output of the address register 23 and the output of the way designation register 24. In the process, as shown in FIG. 2, the bit held in the way designation register 24 is assigned to the least significant bit of the address connected to the tag memory 12.

FIG. 3 shows a tag address mapping in the tag memory 12. The tag data is assigned a 36-bit data bus width, and the areas of WAY 0, WAY 1 are repetitively assigned.

With reference to FIG. 4, the tag address control circuit 25 of the external cache control circuit 21 will be explained. A state machine 31 for controlling the access to the tag memory 12 assumes the following modes.

Reference numerals 32 to 36 indicate the following modes:

32 . . . Idle mode (IDLE)
33 . . . WAY 0 read address send mode (RD0)
34 . . . WAY 1 read address send mode (RD1)
35 . . . WAY 0 write address send mode (WT0)
36 . . . WAY 1 write address send mode (WT1)

The state machine 31 indexes WAY 0 and WAY 1 in that order at the time of cache indexing, and writes only into the way to be updated at the time of tag update.

The state machine 31 outputs the tag address way signal (TAG_AD_WAY), the tag read address select signal (AG_RDAD_SEL) or the tag write address select signal (TAG_WTAD_SEL) according to each mode.

The tag read address select signal (TAG_RDAD_SEL) becomes active and indicates that the way accessed is WAY 1 in modes 34, 36 (RD1, WT1). When the tag read address select signal is not active, on the other hand, it indicates that the way accessed is WAY 0.

The tag read address select signal (TAG_RDAD_SEL) becomes active and causes the switch 22 to select the tag index address signal in modes 33, 34 (RD0, RD1). The tag write address select signal (TAG_WTAD_SEL) becomes active and causes the switch 22 to select the tag update address in modes WT0, WT1.

Figure 5:
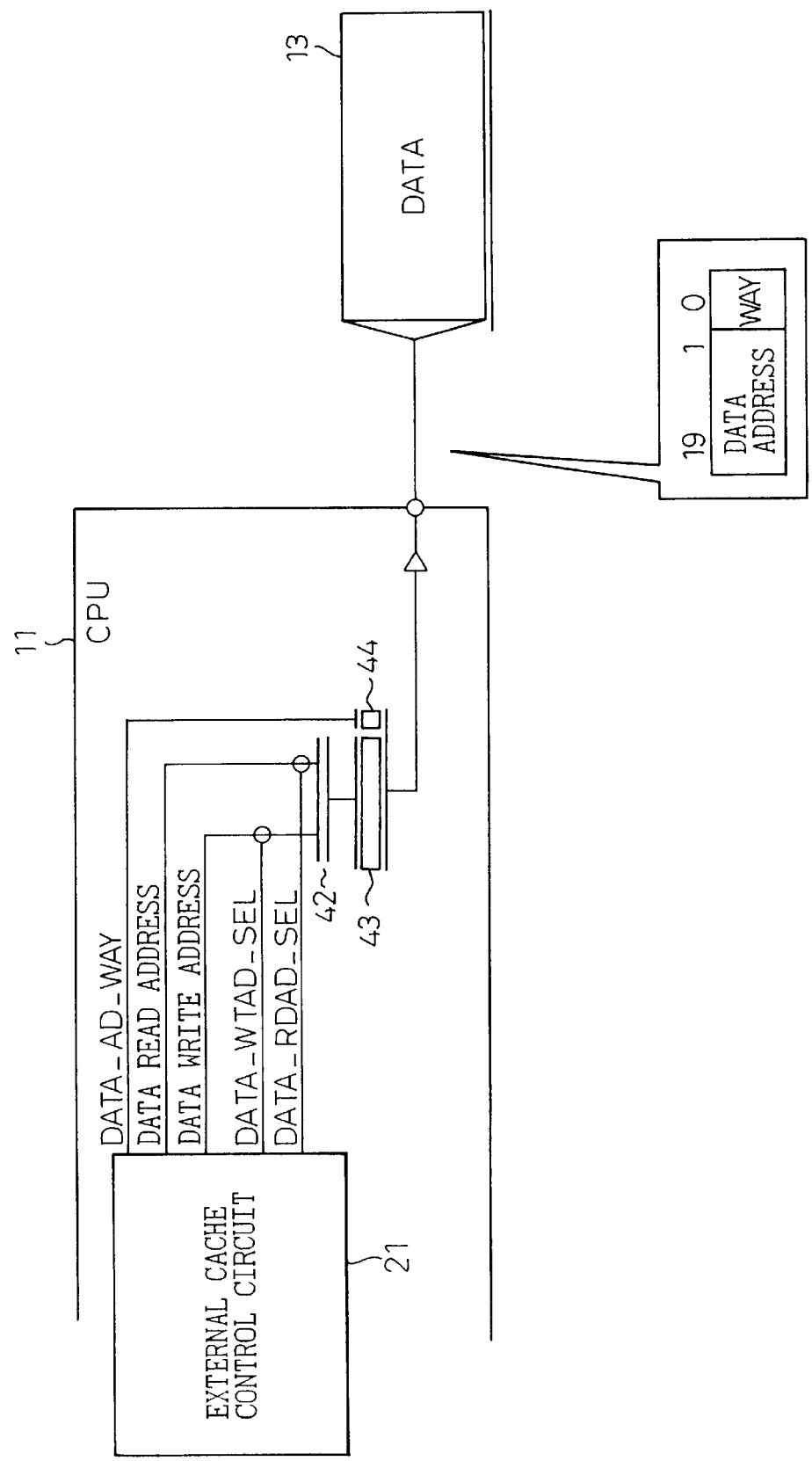
FIG. 5 shows a configuration of a circuit for indexing and updating a data memory of a cache control apparatus according to the invention.
Figure 6:
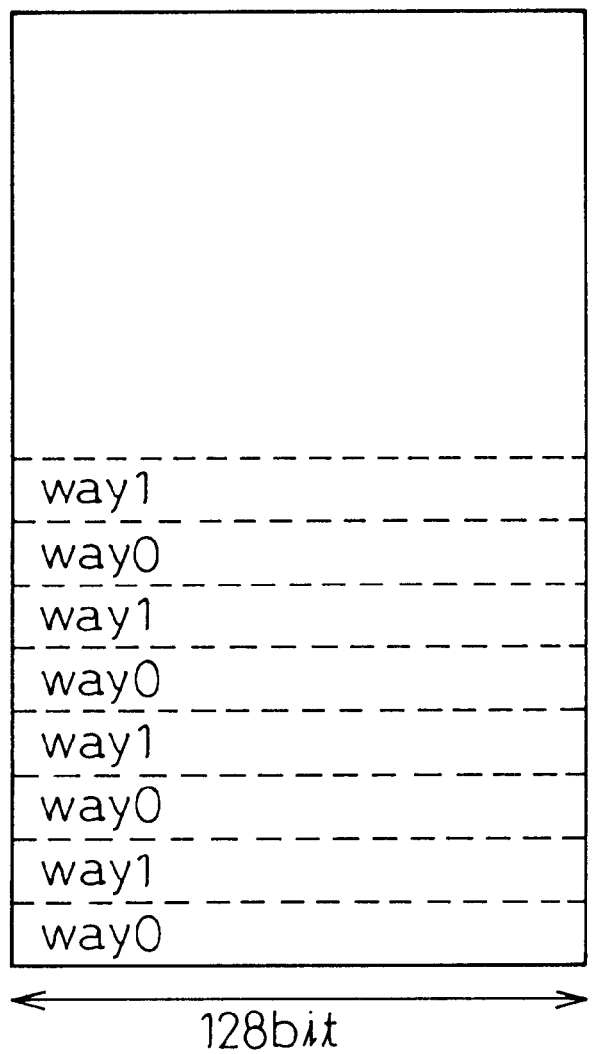
FIG. 6 shows address mapping of the data memory in FIG. 5.
Figure 7:
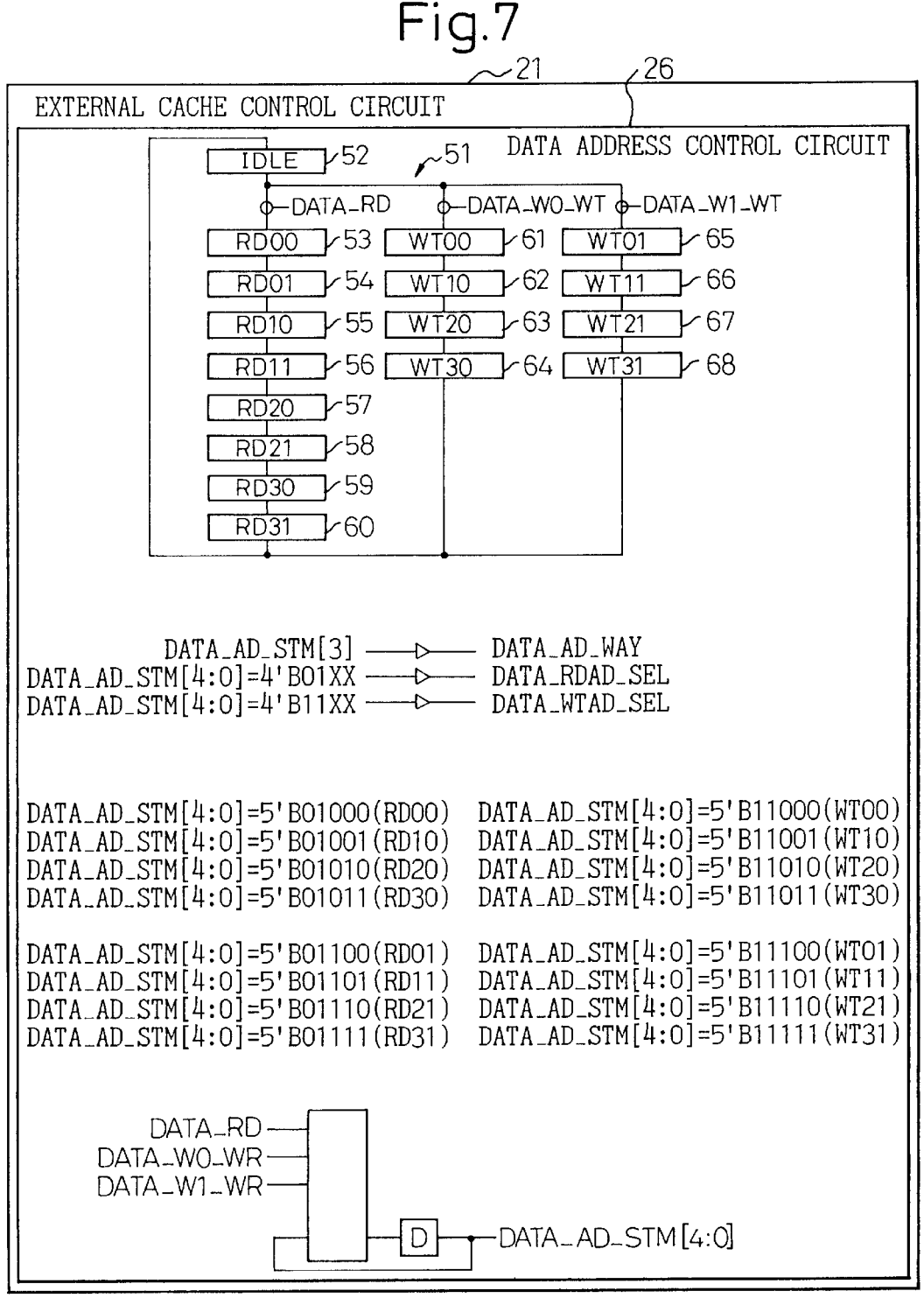
FIG. 7 shows a configuration of an external cache control circuit in FIG. 5.

With reference to FIGS. 5 to 7, a configuration for indexing and updating the data memory 13 will be explained. FIG. 5 shows a configuration of the circuit for indexing and updating the data memory 13. FIG. 6 shows an address mapping of the data memory 13. FIG. 7 shows a configuration of the external cache control circuit 21.

In the example described below, assume that the accessor is the internal cache of the CPU 11, the access is accomplished by transferring in cache blocks of 64 bytes, the data bus width is 16 bytes (128 bits) and that four data responses are required for each access.

In FIG. 5, the external cache control circuit 21 outputs the data read address signal or the data write address signal and the data address way signal (DATA_AD_WAY), and further outputs the data read address select signal (DATA_RDAD_SEL) and the data write address select signal (DATA_WTAD_SEL).

The switch 42 selects the data index address or the data update address in response to the data read address select signal (DATA_RDAD_SEL) and the data write address select signal (DATA_WTAD_SEL). The selected signal is input to the address register 43. The data address way output from the external cache control circuit 21 is input to the way designation register 44.

The address connected to the data memory 13 combines the output of the address register 43 and the output of the way designation register 44. In the process, as shown in FIG. 5, the bit held in the way designation register 44 is assigned to the least significant bit of the address connected to the data memory 13.

FIG. 6 shows a data address mapping in the data memory 13. The data is assigned a 128-bit data bus width, and the areas of WAY 0 and WAY 1 repetitively.

With reference to FIG. 7, the data address control circuit 26 of the external cache control circuit 21 will be explained. The modes of the state machine 51 for controlling the access to the data memory are as follows:

Reference numeral 52 designates an idle mode (IDLE).

Reference numerals 53 to 60 designate the following modes for indexing:

53 . . . WAY 0 first word read address.send mode (RD00)
54 . . . WAY 1 first word read address send mode (RD01)
55 . . . WAY 0 second word read address send mode (RD10)
56 . . . WAY 1 second word read address send mode (RD11)
57 . . . WAY 0 third word read address send mode (RD20)
58 . . . WAY 1 third word read address send mode (RD21)
59 . . . WAY 0 fourth word read address send mode (RD30)
60 . . . WAY 1 fourth word read address send mode (RD31)

Reference numerals 61 to 67 designate the following modes for updating:

61 . . . WAY 0 first word write address send mode (WT00)
62 . . . WAY 0 second word write address send mode (WT10)
63 . . . WAY 0 third word write address send mode (WT20)
64 . . . WAY 0 fourth word write address send mode (WT30)
65 . . . WAY 1 first word write address send mode (WT01)
66 . . . WAY 1 second word write address send mode (WT11)
67 . . . WAY 1 third word write address send mode (WT21)
68 . . . WAY 1 fourth word write address send mode (WT31)

The state machine 51 reads WAY 1 and WAY 0 alternately at the time of reading the cache data and writes only the way to be updated at the time of updating.

The state machine 51 outputs, depending on the mode involved, the data address way signal (DATA_AD_WAY), the data read address select signal (DATA_RDAD_SEL) or the data write address select signal (DATA_WTAD_SEL).

The data address way signal (DATA_AD_WAY) becomes active in modes RD01, RD11, RD21, RD31, WT01, WT11, WT21, WT31, and indicates that the way accessed is WAY 1. In the case where the data address way signal is not active, on the other hand, it indicates that the way accessed is WAY 0.

The data read address select signal (DATA_RDAD_SEL) becomes active and causes the switch 42 to select the data memory address signal in mode RDxx. The data write address select signal (DATA_WTAD_SEL), on the other hand, becomes active and causes the switch 42 to select the data memory address in mode WTxx.

Figure 8:
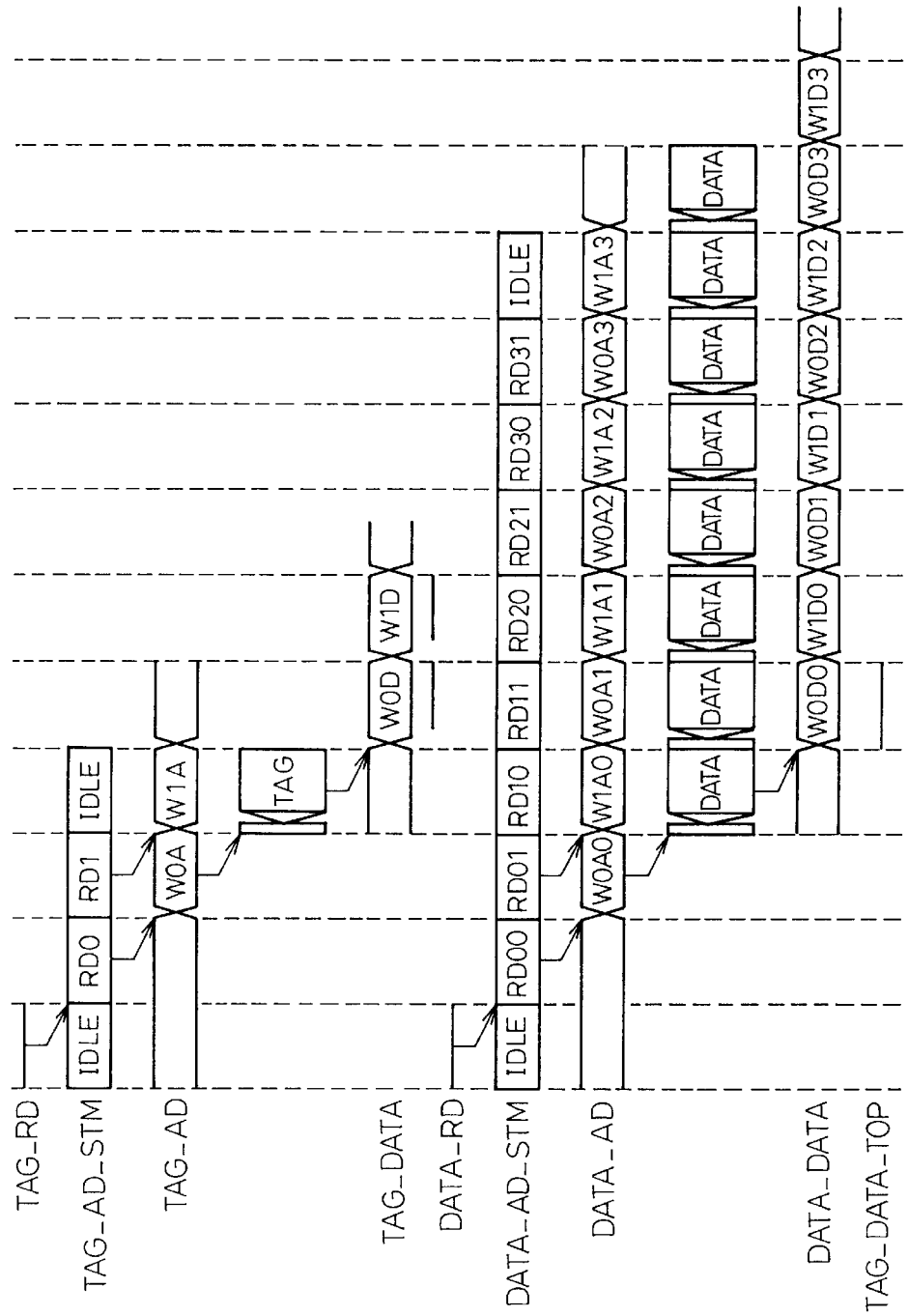
FIG. 8 is a time chart showing the operation of reading from the tag memory and the data memory in FIGS. 2 to 7.
Figure 9:
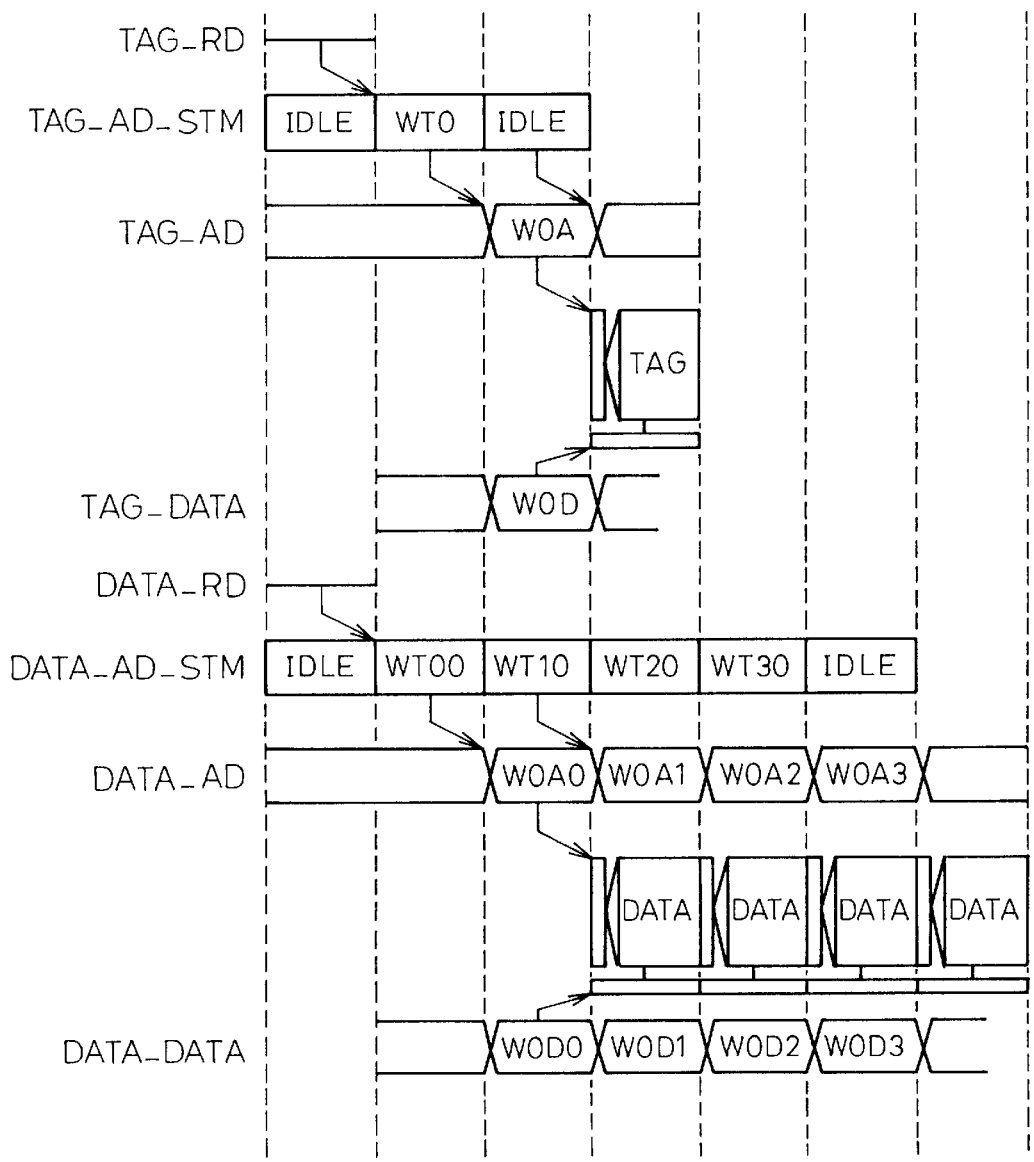
FIG. 9 is a time chart showing the operation of writing into the tag memory and the data memory in FIGS. 2 to 7.

With reference to FIGS. 8 and 9, the timing of indexing and the timing of updating the tag and the data in FIGS. 2 to 7 will be explained.

FIG. 8 is a time chart for reading the tag and the data.

TAG_RD designates an access start signal for the tag memory 12. TAG_AD_STM represents the mode of the state machine 31. In accordance with each mode, W0A, W1A are output as tag address (TAG_AD) in the following clock (cycle). As a result, W0D, W1D are read as the tag data (TAG_DATA) from the tag memory 12. Each WAY (0, 1) constituting the data in the tag memory is read by time division at the time of indexing, and therefore even when the number of ways increases, the hardware amount need not be increased.

DATA_RD indicates an access start signal for the data memory 13. DATA_AD_STM indicates the mode of the state machine 51 for outputting RD00, RD01, RD10 and so forth. In accordance with each mode, W0A0, W1A0, W1A1 and so forth are output as the data address (DATA_AD) in the following clock. As a result, W0D0, WLD0, W0D1 and so forth are output as cache data (DATA_DATA) from the data memory 13. TAG_DATA_TOP indicates the leading position of the tag data (TAG_DATA). Each WAY (0, 1) constituting the data in the data memory 13 is read also by time division at the time of indexing, and therefore even when the ways are increased in number, the hardware amount is not required to be increased.

FIG. 9 is a time chart for writing the tag and data.

At the time of updating the tag and data, tag data (TAG_DATA) and the cache data (DATA_DATA) are written for each WAY (0, 1).

In the tag memory 12, a write signal (WT0) is output to and the tag data (W0D) is written in one way (WAY 0).

In the data memory 13, the write signals WT00, WT10 and so forth are output to one way (WAY 0), and W0A0, W0A1 and so forth are output as data address (DATA_AD). As a result, the data W0D0, W0D1 and so forth are written in the data memory 13.

As explained above, at the time of indexing the cache tag memory, the cache tag data is read by time division. Thus, a hit judgment requires the judgment on the cache tag data read sequentially by time division.

Figure 10:
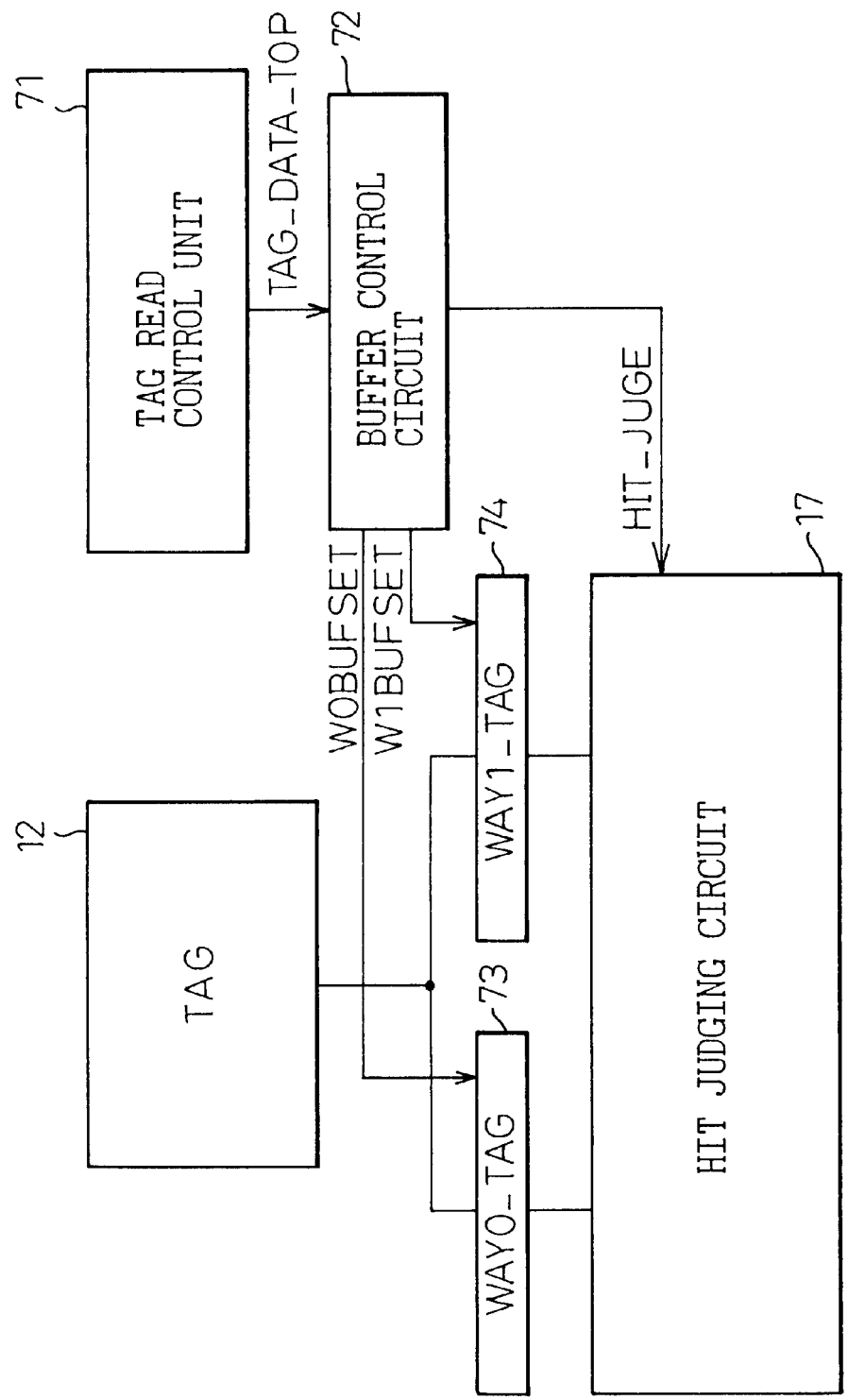
FIG. 10 shows a configuration of a circuit for hit judgment after the cache data in all the ways are prepared in the cache control apparatus according to the invention.
Figure 11:
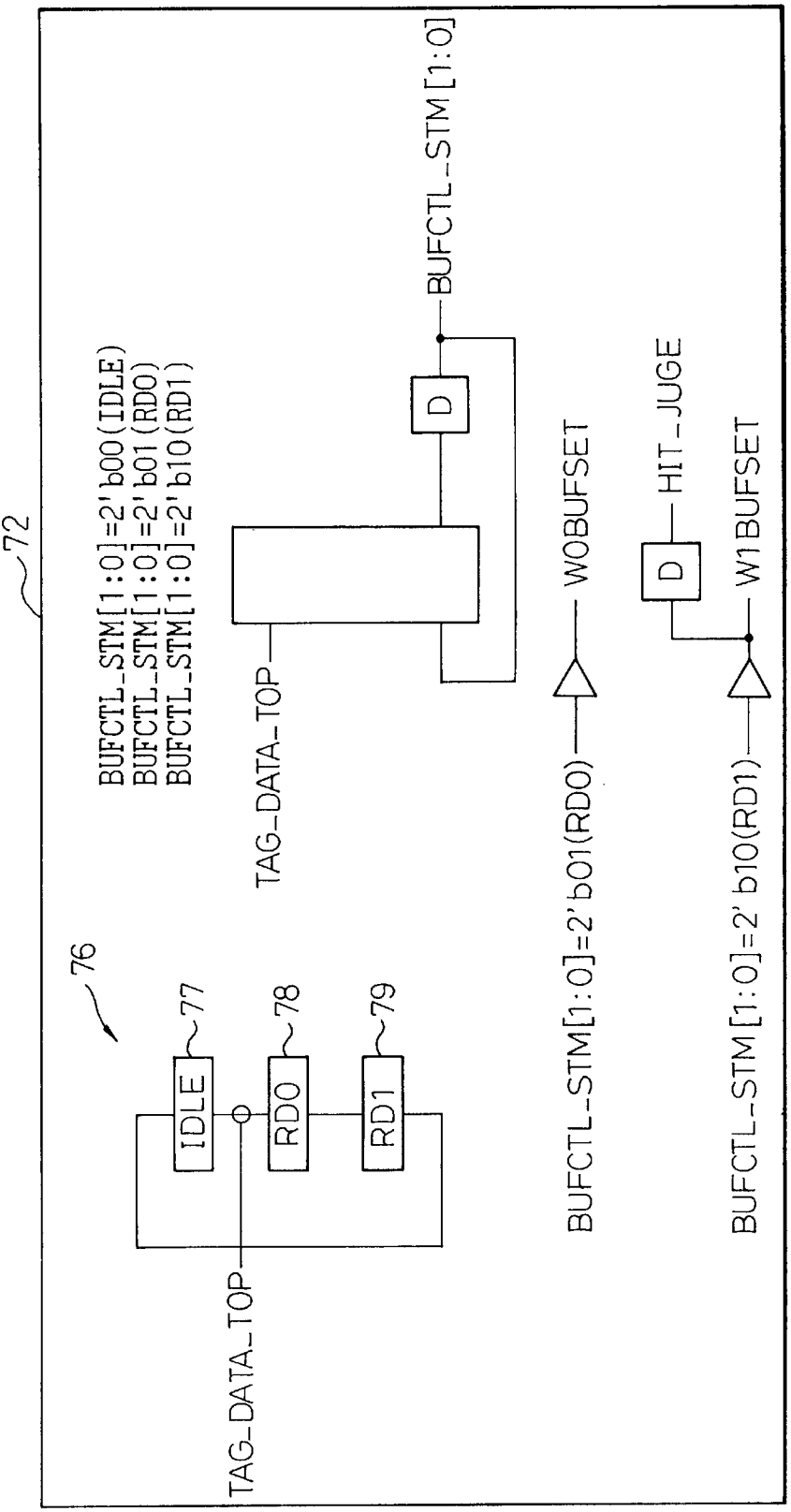
FIG. 11 shows a configuration of a buffer control circuit of FIG. 10.
Figure 12:
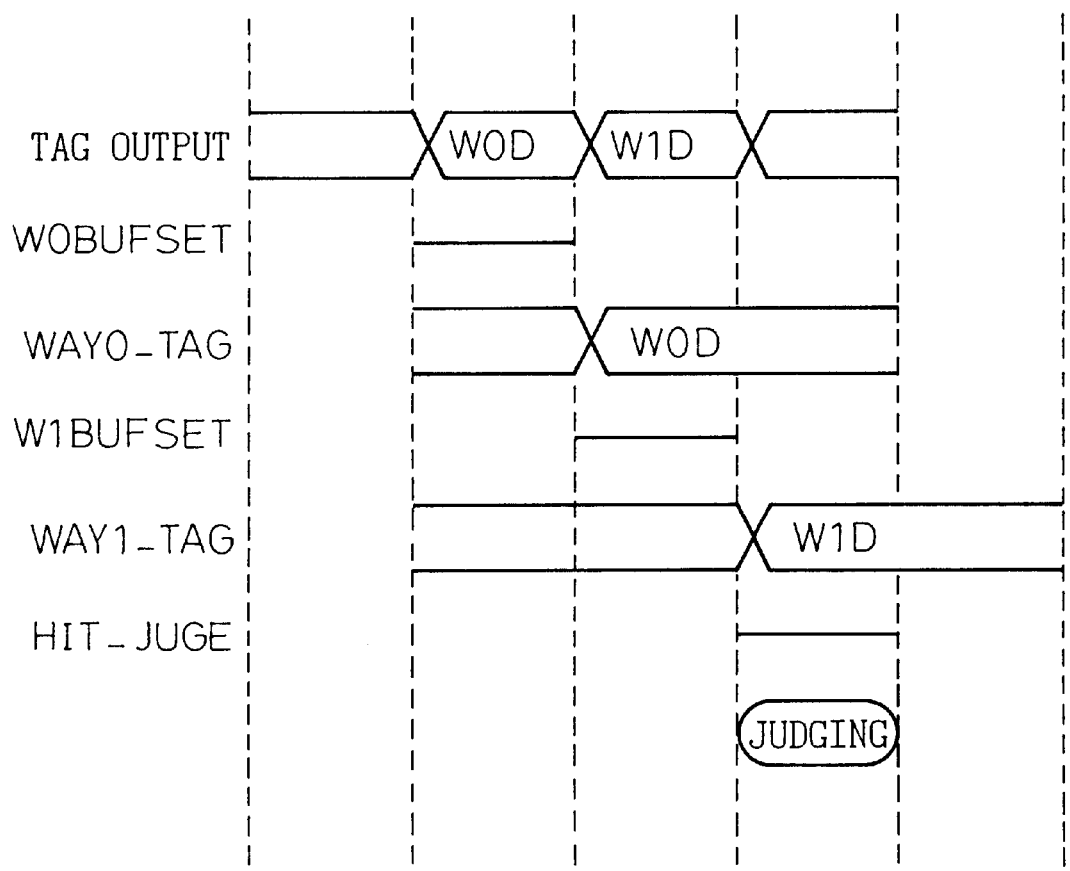
FIG. 12 is a time chart showing the operation of the circuit of FIG. 10.

With reference to FIGS. 10 to 12, an explanation will be given of the case in which the cache tag data indexed by time division are held until the data for all the ways are prepared, so that the hit judgment is carried out for all the ways at the same time.

FIG. 10 is a diagram showing a circuit configuration.

In FIG. 10, a signal (TAG_DATA_TOP) for starting the buffer control circuit 72 is output from the tag read control unit 71. The buffer control circuit 72 produces the switch signal (WOBUFSET or WIBUFSET), so that the cache tag data read by time division for each WAY (0, 1) from the tag memory 12 is transferred to and held in a WAY 0 tag data holding register 73 and a WAY 1 tag data holding register 74. After that, a hit judgment timing signal (HIT_JUGE) is output to a hit judgment circuit 17.

FIG. 11 shows a configuration of the buffer control circuit 72.

The start signal (TAG_DATA_TOP) output from the tag read control unit 71, as shown in FIG. 8, indicates the arrival of the leading read data of the tag memory. The state machine 76 of the buffer control circuit 72 assumes an idle mode (IDLE) 77, a WAY 0 read address send mode (RD0) 78 and a WAY 1 read address send mode (RD1) 79. Each mode 78, 79 activates the switch signal (WOBUFSET or WIBUFSET) as a sample signal to the tag data holding registers 73, 74.

FIG. 12 is a time chart showing the operation at the of hit judgment.

The switch signal (WOBUFSET) for selecting WAY 0 is output with the clock for the tag memory 12 to output the WAY 0 data W0D, and one clock later, the tag data W0D is recorded in the WAY 0 tag data holding register 73. With this clock, the switch signal (WIBUFSET) for selecting WAY 1 is output, and one clock later, the tag data W1D is recorded in the WAY 1 tag data holding register 74. With this clock, the hit judgment timing signal (HIT_JUGE) becomes active. The hit judging unit 17 produces the logic product of the result of comparison between the tag data holding register 73 or 74 and the access address, and the judgment timing signal (HIT_JUGE) for each way, and if active, judge a hit for each way.

With reference to FIGS. 13 to 17, an explanation will be given of the case in which the cache tag data indexed by time division is judged for a hit for each indexed way.

Figure 13:
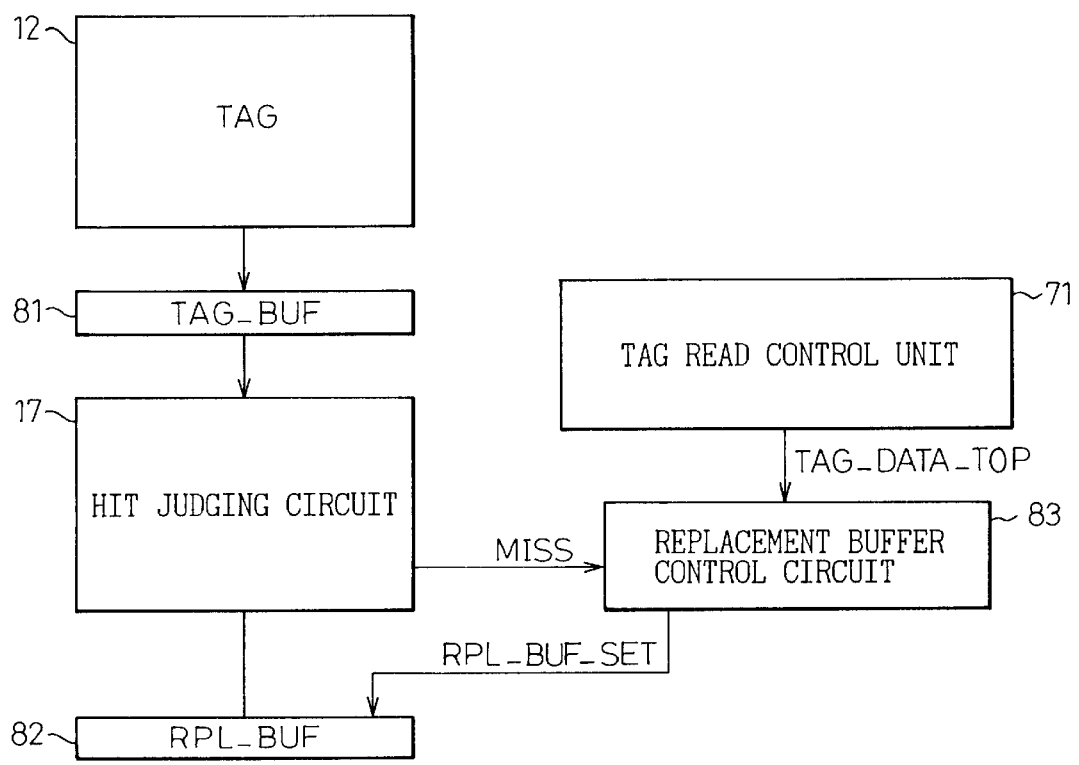
FIG. 13 shows a configuration of a circuit for sequentially making a hit judgment for the cache tag data in the cache control apparatus according to the invention.
Figure 15:
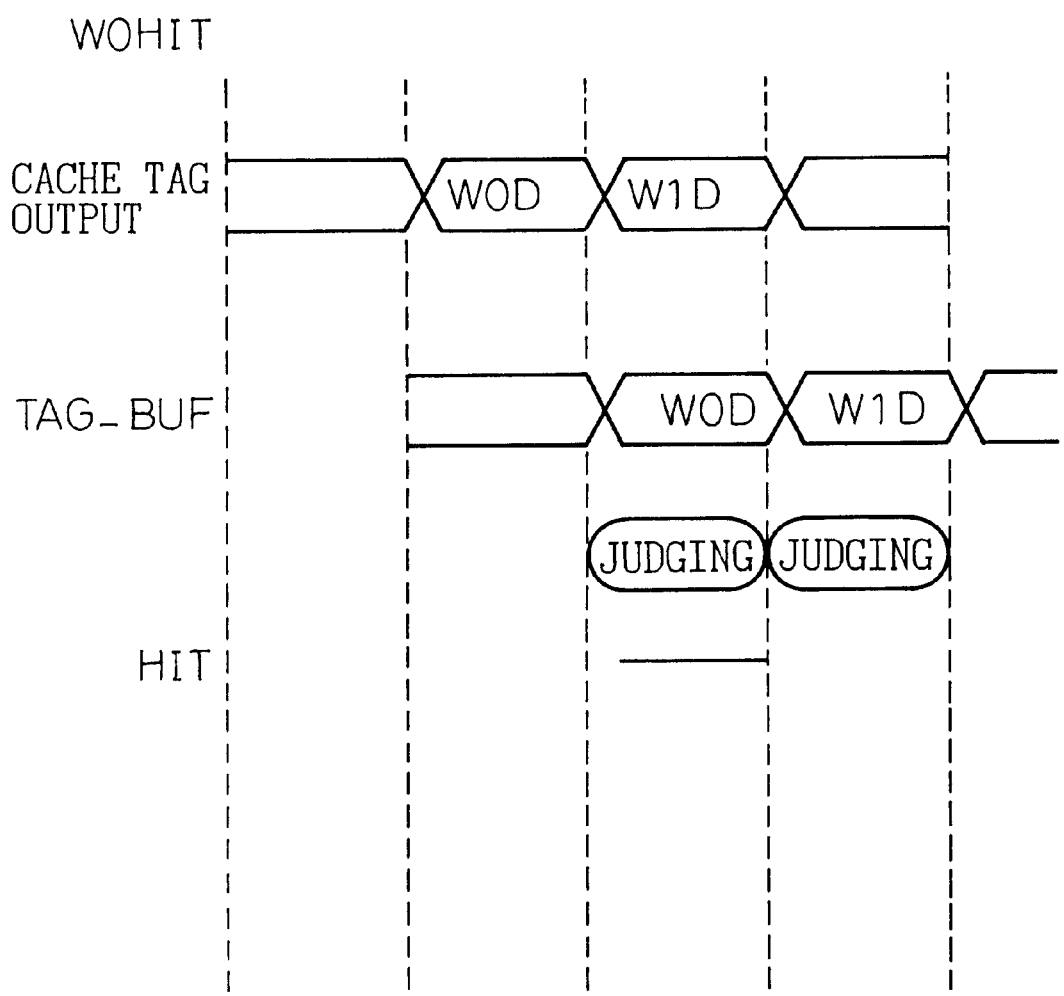
FIG. 15 is a time chart showing the operation of the circuit of FIG. 13.

FIG. 13 is a block diagram showing a circuit for hit judgment, and FIG. 15 is a time chart for successful hit judgment.

The cache tag data W0D, W1D indexed by time division for each way from the cache tag 12 are transferred, one clock behind each other, sequentially to the tag buffer (TAG_BUF) 81. The hit judging circuit 17 makes judgment for each index on the cache tag data W0D, W1D indexed by time division. The hit judgment timing is produced by the hit judging unit 17 by the start signal (TAG_DATA_TOP) from the tag read control unit 71. The replacement buffer control circuit 83 controls the replacement buffer 82 by the start signal (TAG_DATA_TOP) and the cache miss signal (MISS).

FIG. 15 shows an example in which WAY 0 is hit. In the case where all the ways are missed, the cache tag is returned to the main memory. In this case, in view of the fact that the tag data is read by time division, the cache tag data to be returned to the main memory may have already disappeared in the last way where it is judged. that all the ways are missed. To cope with this inconvenience, the replacement buffer (RPL_BUF) 82 is used.

Figure 14:
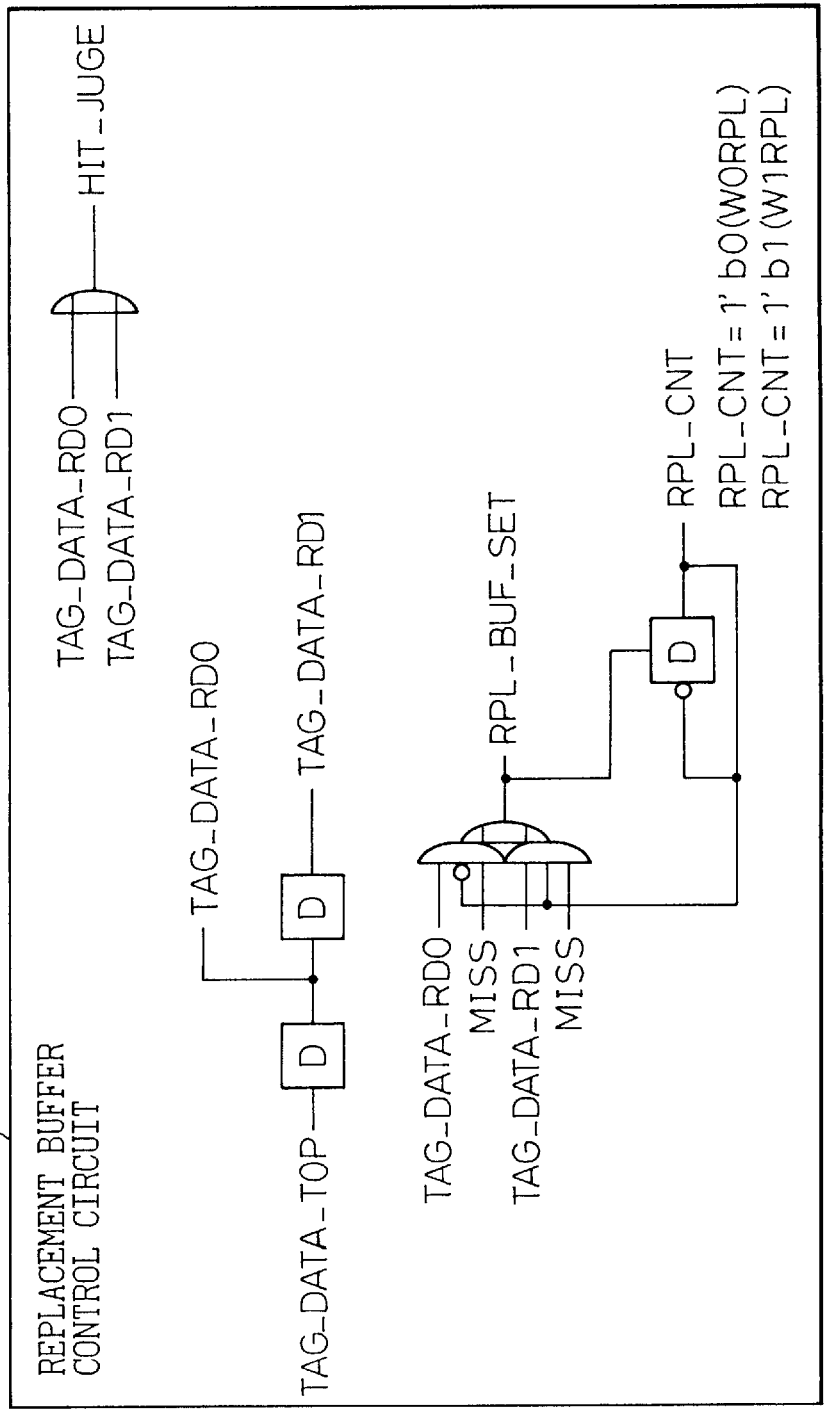
FIG. 14 shows a configuration of a replacement buffer circuit in FIG. 13.
Figure 16:
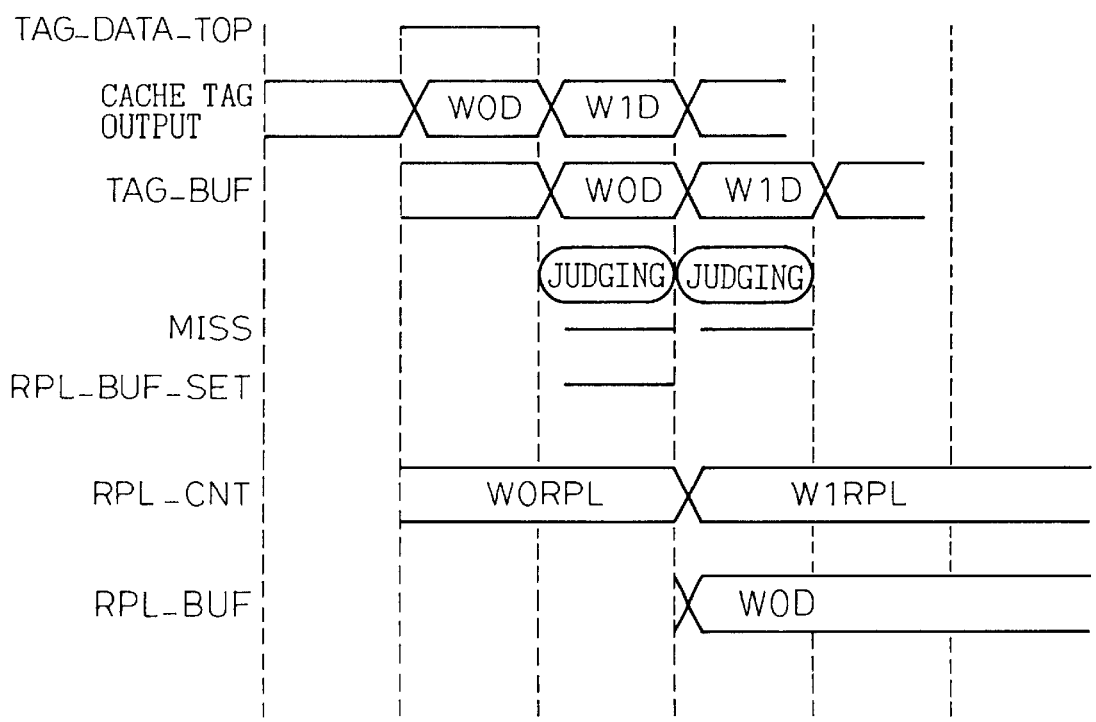
FIG. 16 is a first time chart showing the sequence for WAY 1 constituting a replacement way in the circuit shown in FIG. 13.
Figure 17:
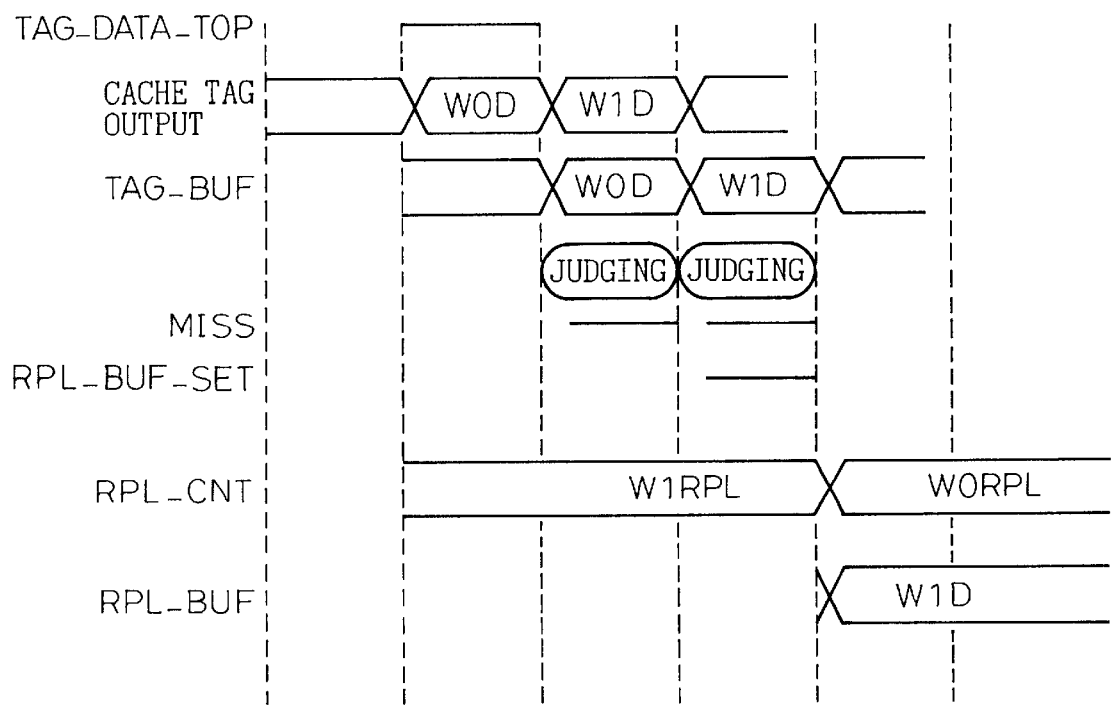
FIG. 17 is a second time chart showing the sequence for WAY 1 constituting a replacement way in the circuit shown in FIG. 13.

FIG. 14 shows a configuration of the replacement buffer control circuit 81, and FIGS. 15 to 17 show the time charts thereof.

In response to the start signal (TAG DATA_TOP) from the cache tag read control unit 71, the hit judgment timing signal (HIT_JUGE) is output from the buffer control circuit 72 to the hit judging unit 17 during the following two clocks. The example shown in FIG. 15 represents the case in which WAY 0 is hit as the result of hit judgement. FIGS. 16 and 17, on the other hand, show the state in which both WAY 0 and WAY 1 are hit.

The replacement way is determined alternately for WAY 0, 1, 0 in that order. As a result, as shown in the circuit of FIG. 14, the replacement count signal (RPL_CNT) is generated by the toggle flip-flop (FF). FIG. 16 shows the sequence for the case in which the replacement way is WAY 0, and the replacement count signal is updated at a timing when it is judged that the replacement way, i.e. WAY 0 is missed. At this timing, a timing signal (RPL_BUF_SEL) is generated for setting the cache tag data of the replacement way in the replacement buffer 82.

FIG. 17 shows the sequence for the case in which the replacement way is WAY 1, and the replacement count signal is updated at the timing when it is judged that WAY 1 constituting the replacement way is missed. At this time, a timing signal (RPL_BUF_SET) for setting the cache tag data of the replacement way in the replacement buffer 82 is generated. By the way, the replacement way can be determined, alternatively, by use of a replacement algorithm.

Figure 18:
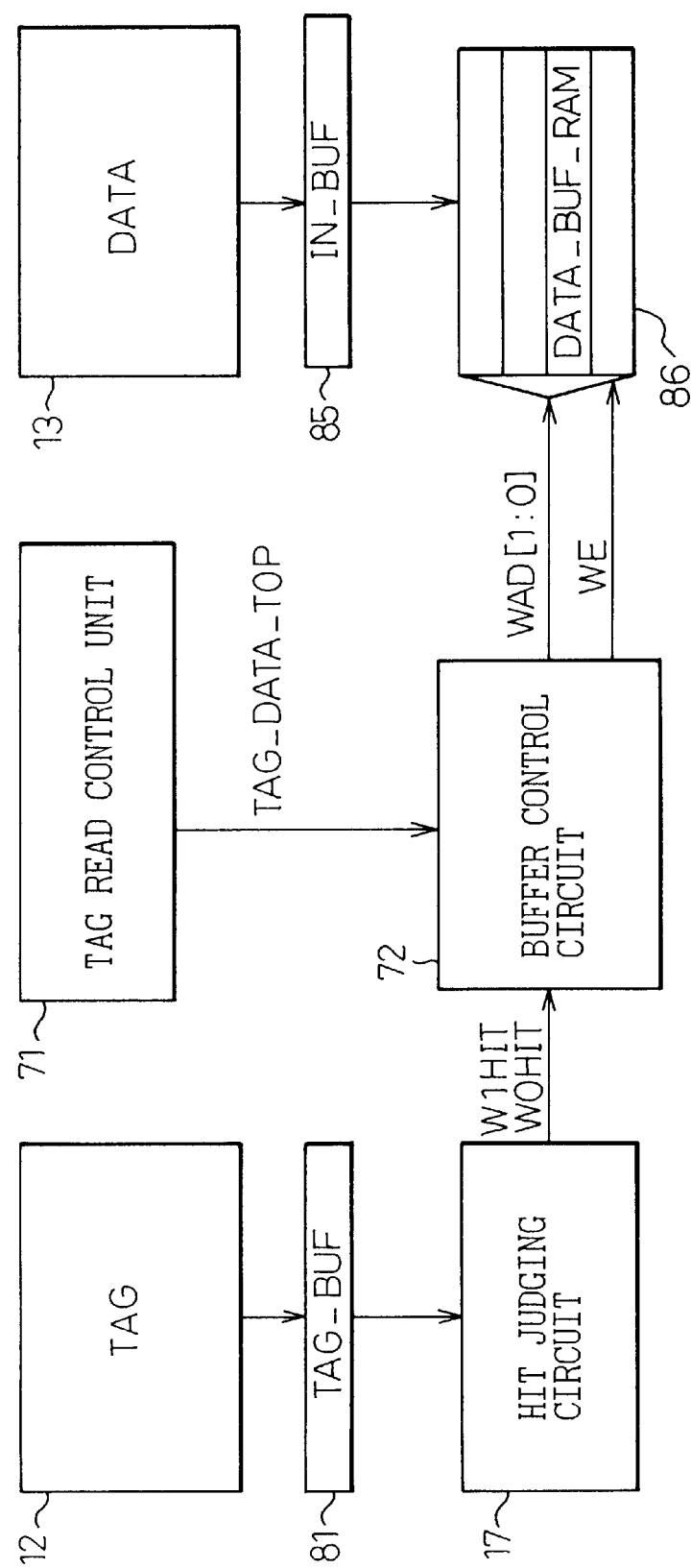
FIG. 18 shows a configuration of a circuit for storing the data hit in the cache control circuit according to this invention.
Figure 19:
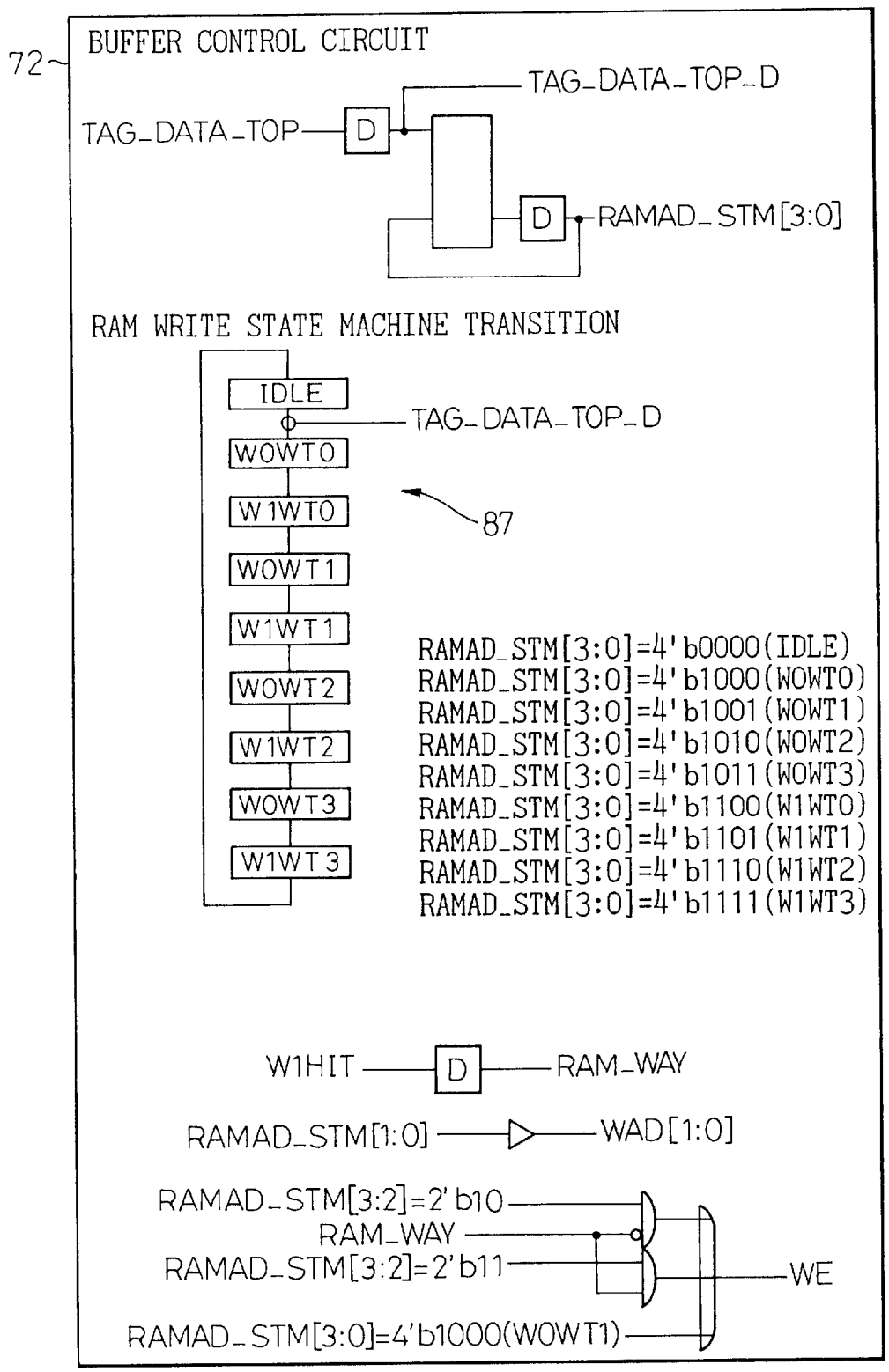
FIG. 19 shows a configuration of a buffer control circuit shown in FIG. 18.
Figure 20:
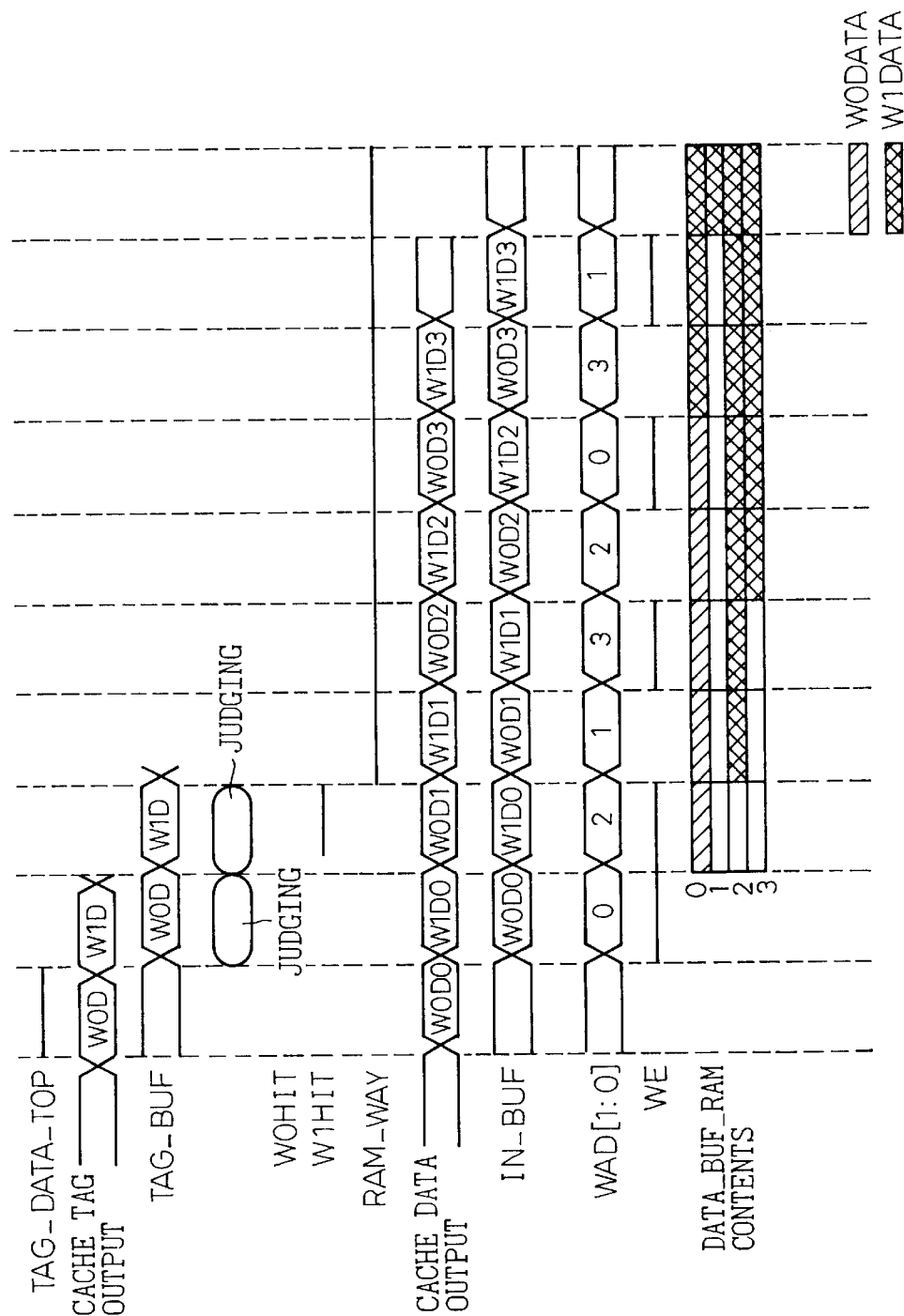
FIG. 20 is a time chart showing the operation of the circuit of FIG. 18.

With reference to FIGS. 18 to 20, an explanation will be given of the process for storing the data of the ways hit.

In the aforementioned cases, in the case where the data transfer path to the accessor is occupied by another data transfer and cannot be used, a buffer is required for temporarily holding the data. In this embodiment, such a buffer is realized in a size smaller than the number of ways. In this case, a holding buffer for the 2-way cache is realized with the size equivalent to one way.

FIG. 18 shows a circuit configuration. In the shown circuits, the cache tag 12, the tag read control unit 71, the buffer control circuit 72, the tag buffer 81 and the hit judging unit 17 are substantially the same as the corresponding parts shown in FIG. 10 or 13. The hit judging circuit 17, when WAY 0 or WAY 1 is hit, outputs a signal (W0HIT or W1HIT) indicating a hit to the buffer control circuit 72.

The data read from the data memory 13 is written in the memory 86 (DATA_BUF_RAM) for holding the data of one cache line through an intermediate buffer 85 for holding the cache data temporarily. In the process, the buffer control circuit 72 outputs a write address WAD and a write permit signal WE to the memory 86.

FIG. 19 shows the contents of the buffer control circuit 72. The state machine 87, in response to the start signal (TAG_DATA _TOP), assumes a mode (W0WT0, W1WT0, W0WT1, W1WT and so forth) in which data of one cache line is written in the RAM (DATA_BUF_RAM) 86 in WAY 0, WAY 1 alternately.

FIG. 20 is a time chart for this case and shows the operation with WAY 1 hit.

In response to the start signal (TAG_DATA_TOP), W0D and W1D of the cache tag data are output from the tag memory 12. The tag buffer 81 holds the cache tag data delayed by one clock, and the hit judging circuit 17 makes a hit judgement. In the case under consideration, the hit judgement is made at W1D, and the hit signal (WAY1HIT) is input to the buffer control circuit 72.

From the data memory 13, the cache data W0D0, W1D0 and so forth for WAY 0 and WAY 1 are output alternately in accordance with the state of the state machine 87. These data are held in the intermediate buffer 85 each one clock later.

A write address signal WAD designating the place where the cache data is stored on the memory 86 is output from the buffer control circuit 72. Initially, the write permit signal WE is output, and therefore the cache data W0D0, W1D0 and so forth are stored sequentially in the memory 86 in accordance with the address WAD regardless of WAY 0 or WAY 1.

Once a hit judgment is made, a signal (RAM_WAY) designating the way of the RAM 86 is output one clock later, and a write permit signal WE is output to the way hit. As a result, the memory 86 is rewritten only by the cache data associated with the way hit.

As described above, the RAM 86 for holding is provided only for one way regardless of the number of ways.

Figure 21:
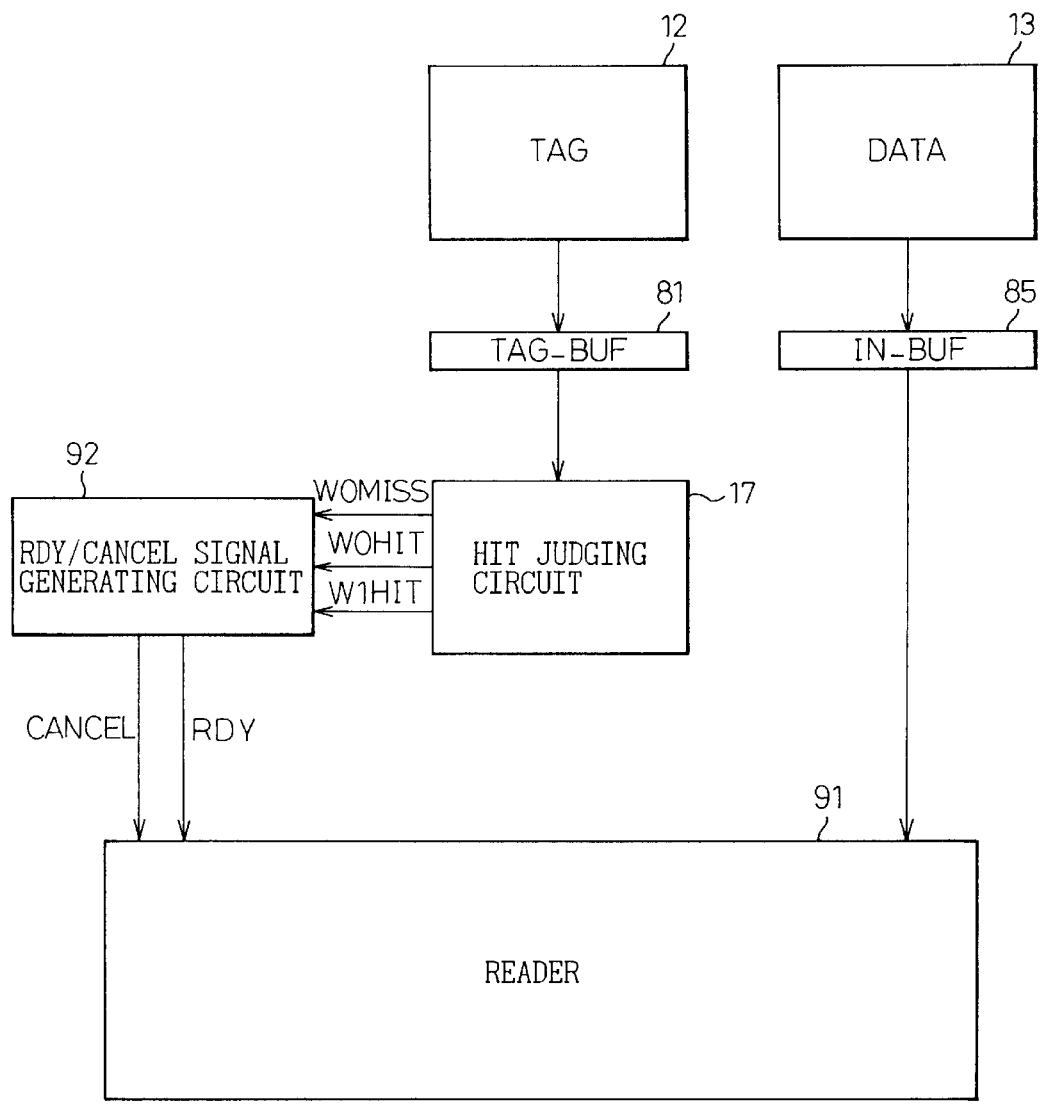
FIG. 21 shows a configuration of a circuit for processing a cache miss judgment in the cache control apparatus according to the invention.
Figure 22:
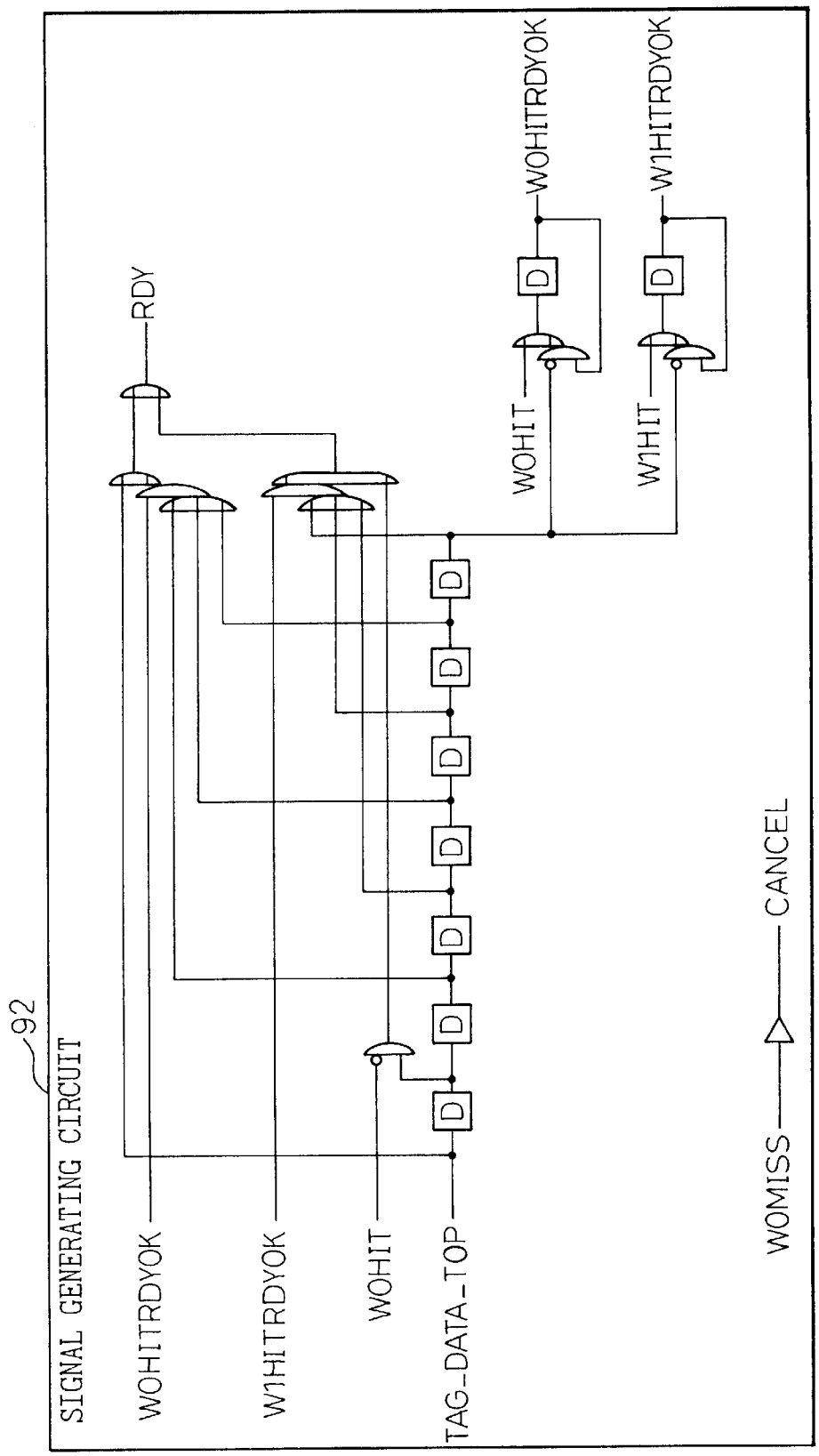
FIG. 22 shows a configuration of a signal generating circuit in FIG. 21.
Figure 23:
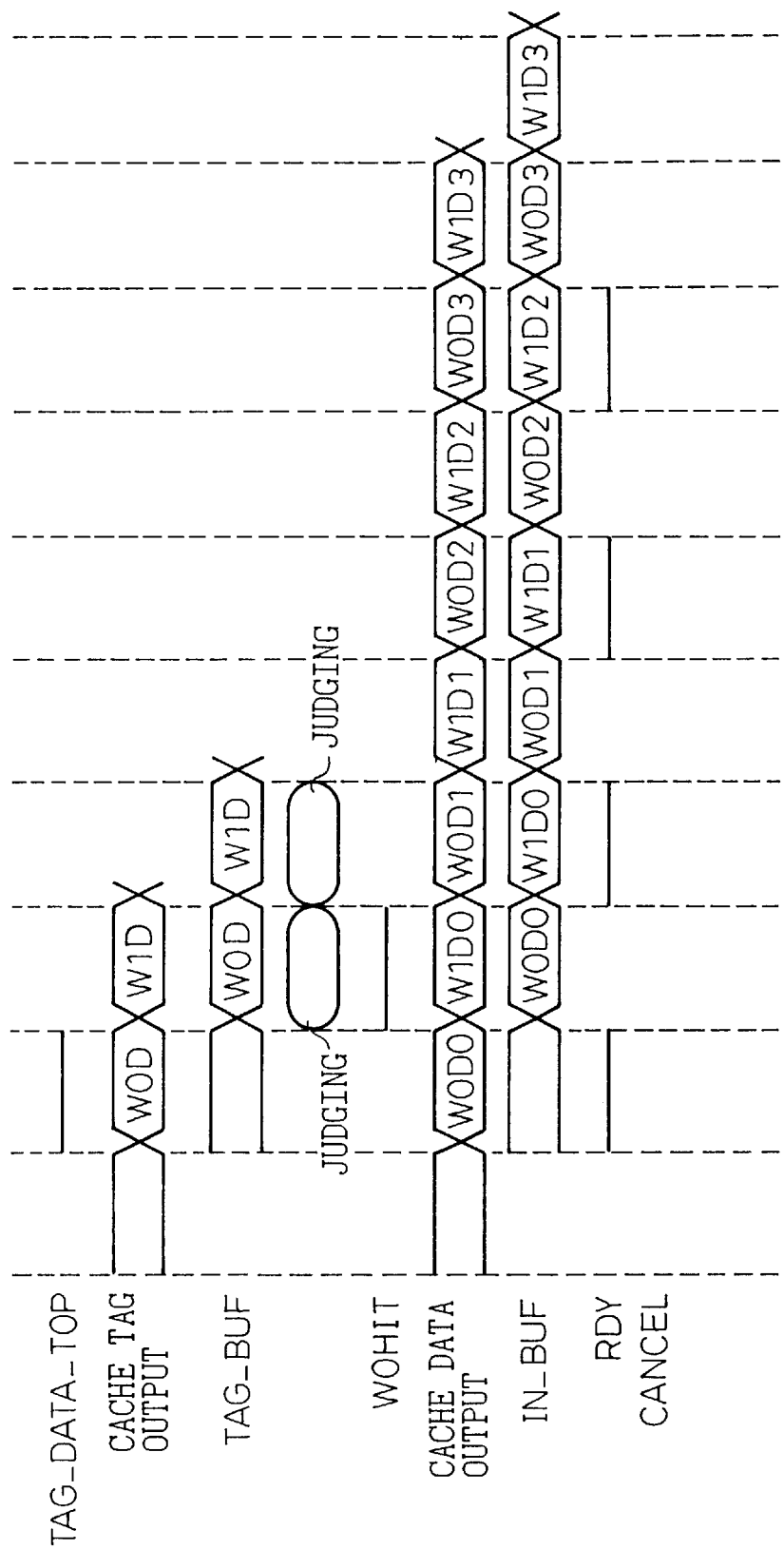
FIG. 23 is a first time chart showing the operation of the circuit of FIG. 21.

With reference to FIGS. 21 to 23, an explanation will be given of the case in which the response of the cache data to the accessor is prepared before the hit judgment and the cancel signal is produced in the case where the judgment is a cache miss.

A circuit configuration is shown in FIG. 21. In this case, the cache data read from the data memory 13 is output through the intermediate buffer 85 to the reader 91 (secondary cache). The hit judging circuit 17, on the other hand, outputs the WA0HIT or WA1HIT signal for the hit way or the W0MISS signal for missing WAY 0 to a response signal (RDY)/cancel signal (CANCEL) generating circuit 92.

Also, from the data memory 13, the cache data W0D0, W1D0, W0D1 and so forth are output, and one clock later, output to the reader 91 through the intermediate buffer 85.

FIG. 22 shows a configuration of the signal generating circuit 92. The signal generating circuit 92 generates the response signal (RDY) and the cancel signal (CANCEL) from the W0HIT signal, the W1HIT signal and the W0MISS signal.

The time chart of FIG. 23 shows the operation of hitting WAY 0.

In response to the start signal (TAG_DATA_TOP), the cache tag data W0D, W1D are output from the cache memory 12, held in the tag buffer 81, and applied to the hit judging unit 17 for hit judgment. In the case of FIG. 23, WAY 0 is hit.

At the same time, the start signal (TAG_DATA_TOP) causes the cache data W0D0, W1D0, W0D1 and so forth to be output from the data memory 13 and held in the intermediate buffer 85.

At the same time as the cache tag data W0D, W1D are output, the response (RDY) signal is output. In the shown case, the hit of WAY 0 is determined by the next clock, and therefore the W0 MISS signal is not generated, and therefore no cancel signal (CANCEL) is output. Also, the response signal (RDY) is issued only to WAY 0. Thus, the reader 91 subsequently uses only the cache data of WAY 0 hit in accordance with the response signal (RDY).

Figure 24:
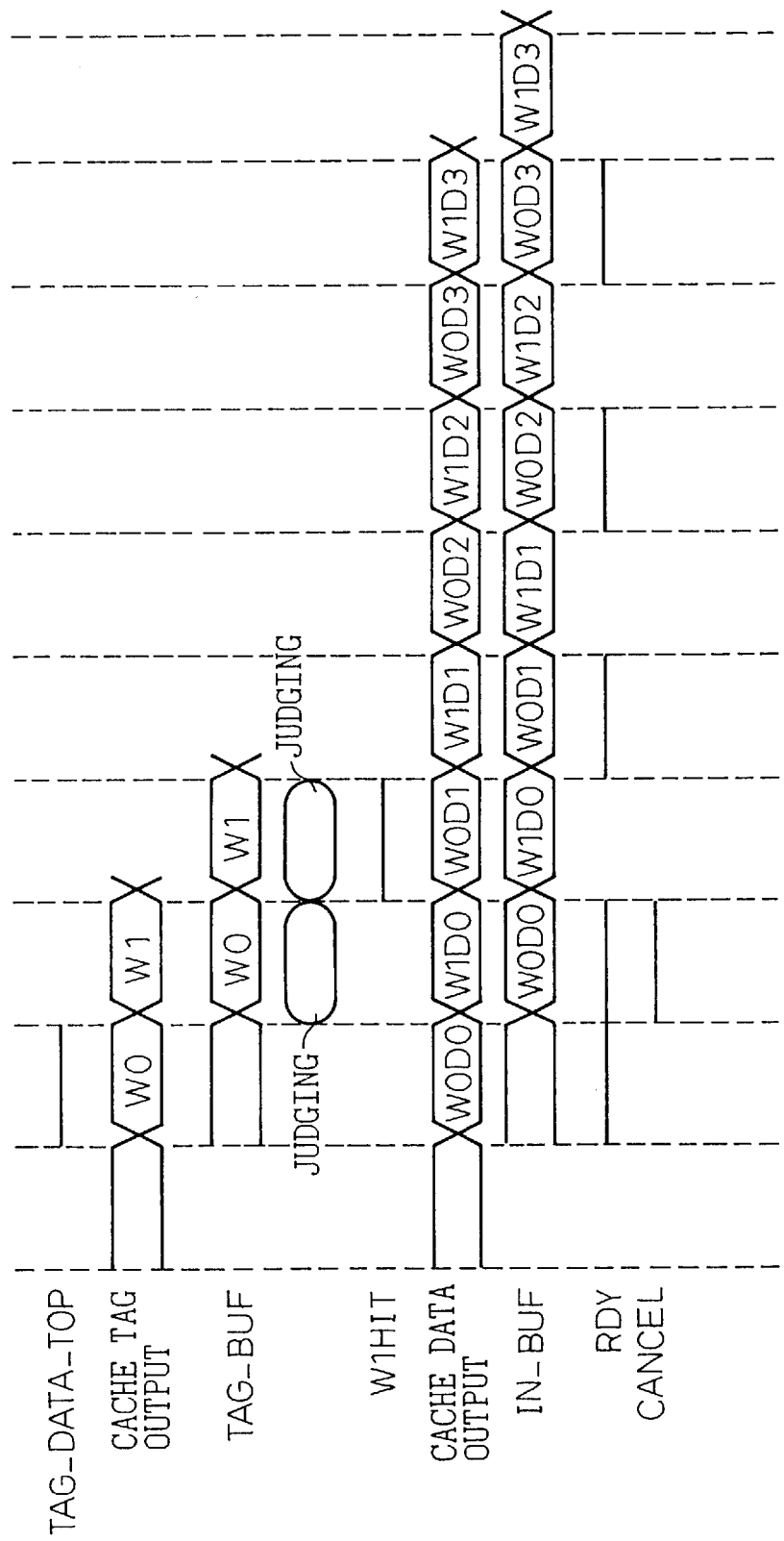
FIG. 24 is a second time chart showing the operation of the circuit of FIG. 21.

The time chart of FIG. 24 shows the operation of missing WAY 0 and hitting WAY 1.

In the case under consideration, the WAY 0 judgment is a cache miss, and therefore the W0MISS signal is input to the circuit 92 from the hit judging unit 17. In this way, the response signal (RDY) is output to the cache data of WAY 1, and the cancel signal is generated for the cache data of WAY 0. As a result, the reader 91 cancels the cache data W0D0 of WAY 0 already input.

When WAY 1 is hit with the next clock, the response signal (RDY) is not generated nor is the cancel signal (CANCEL). Subsequently, therefore, the reader 91 employs the cache data W1D0, W1D1 and so on of WAY 1.

Figure 25:
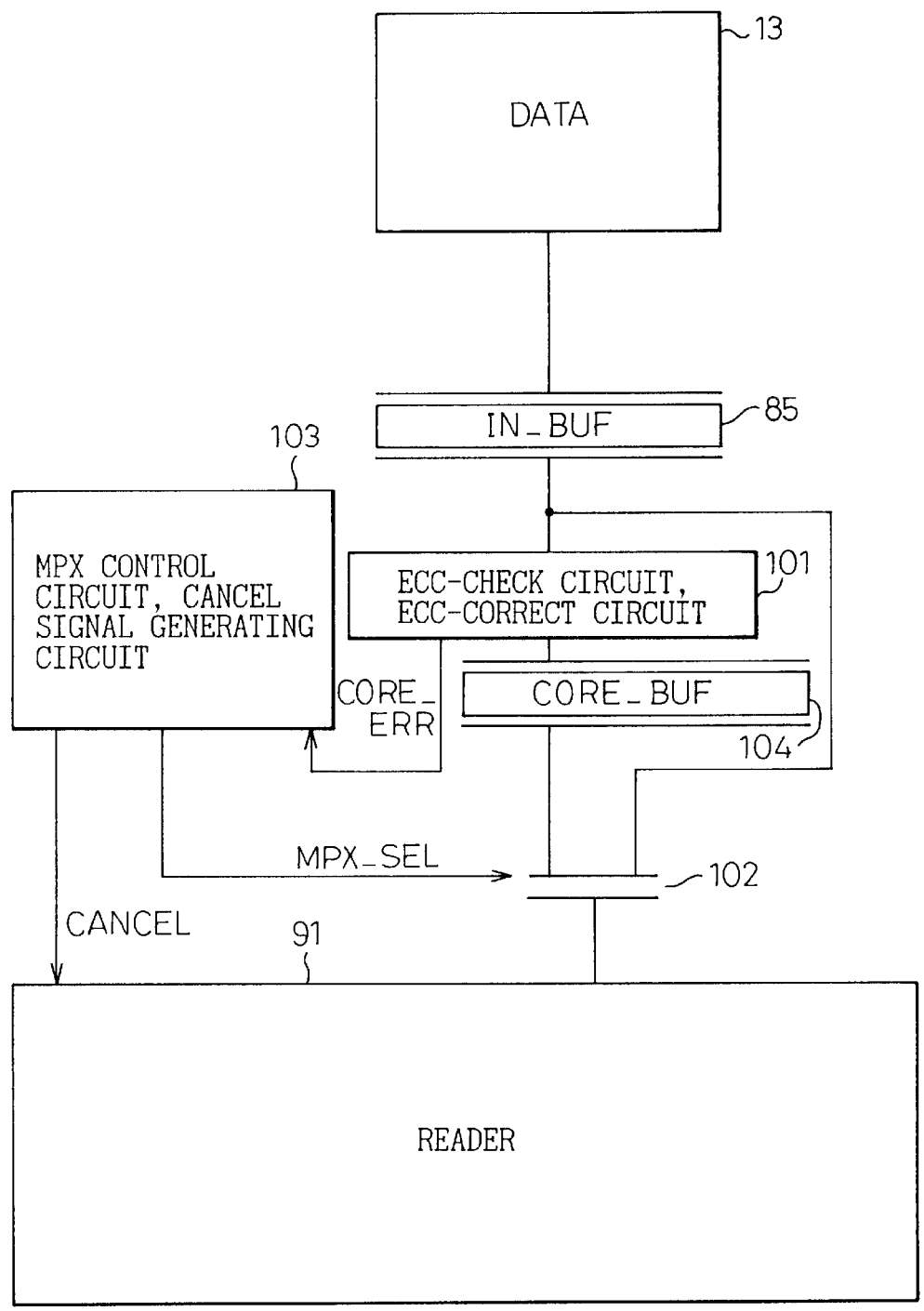
FIG. 25 shows a circuit configuration for protecting the cache data with the ECC code in the cache control apparatus according to the invention.
Figure 26:
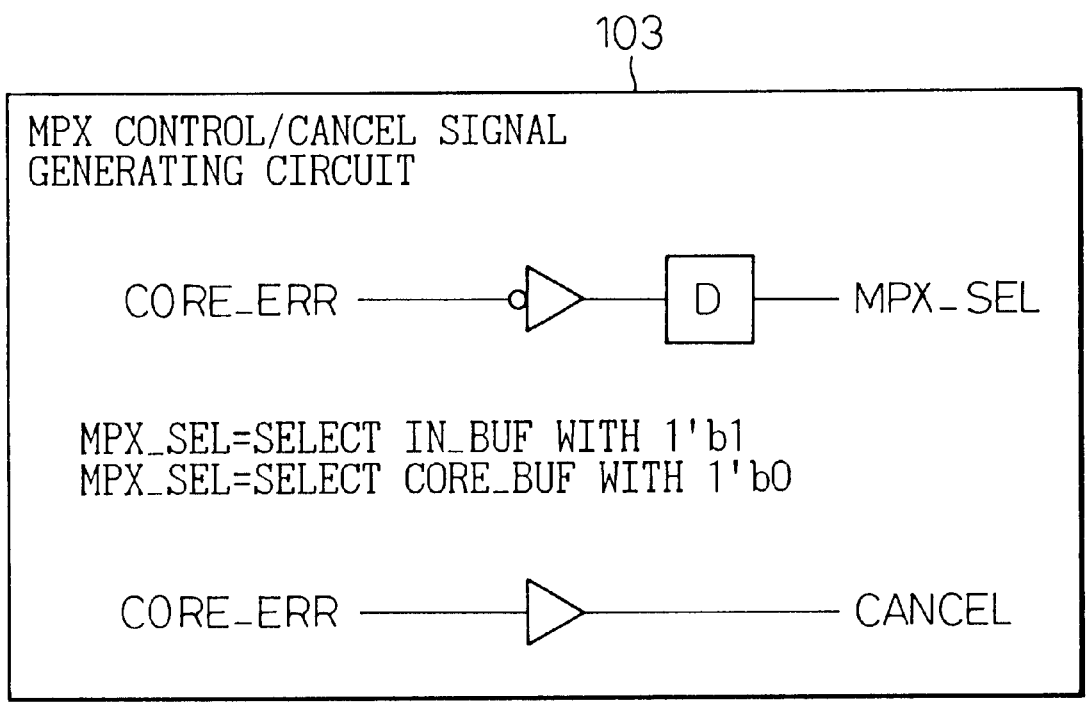
FIG. 26 shows a configuration of a multiplexer control circuit in FIG. 25.
Figure 27:
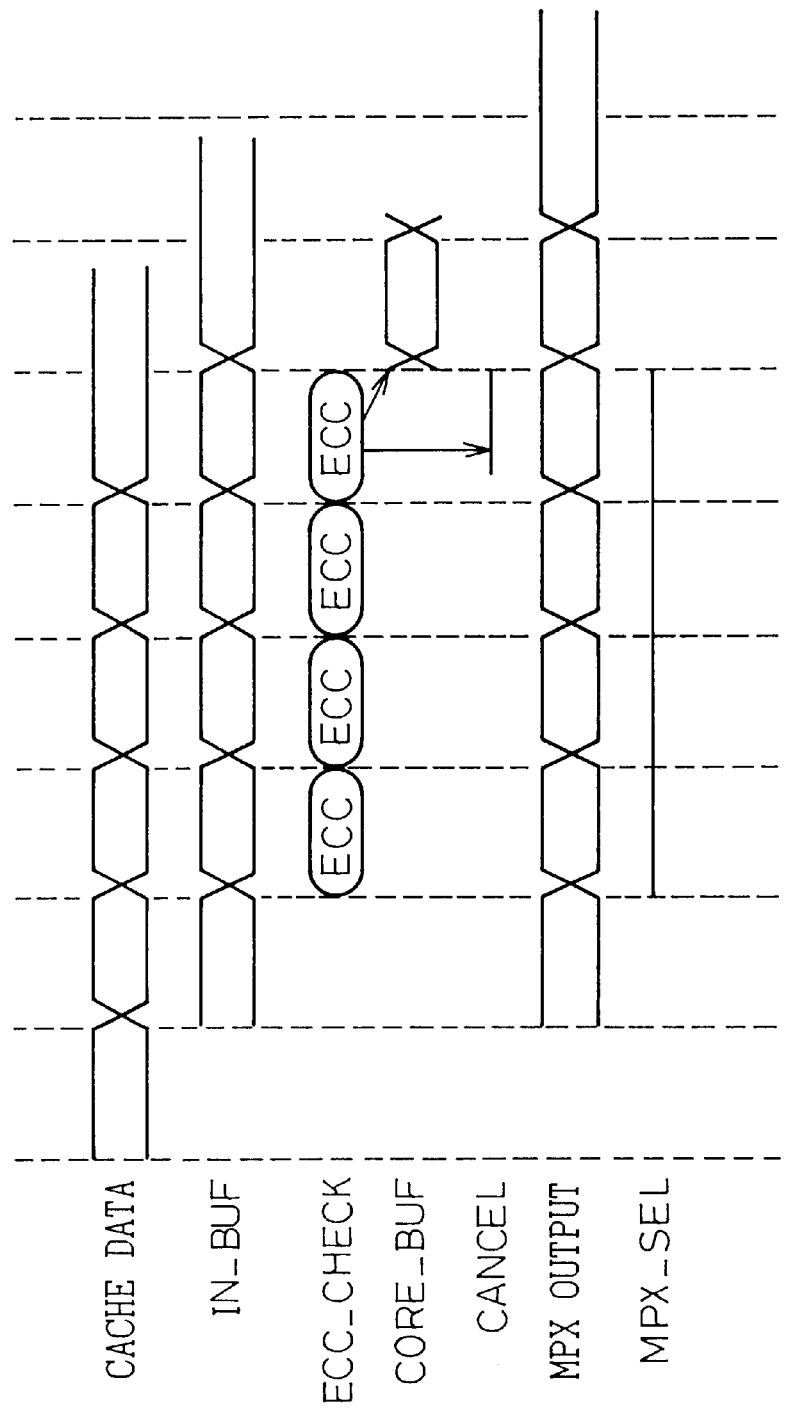
FIG. 27 is a time chart showing the operation of the circuit of FIG. 25.

With reference to FIGS. 25 to 27, an explanation will be given of the process for protecting the cache data with the ECC (error check code).

FIG. 25 shows a circuit configuration.

The cache data read from the data memory 13 is sent through the intermediate buffer 85 to an ECC check (ECC-CHECK)/correct (ECC-CORRECT) circuit 101 and a multiplexer 102. The circuit 101, upon detection of an ECC error, outputs an error correction signal (CORE_ERR) to a MPX control/cancel signal generating circuit 103.

FIG. 26 shows a configuration of the multiplexer (MPX) control/cancel (CANCEL) signal generating circuit 103. The circuit 103 outputs a select signal (MPX_SEL) to the multiplexer 102 in accordance with the error correction signal (CORE_ERR), and outputs a cancel (CANCEL) signal to the reader 91.

With reference to the time chart of FIG. 27, the operation of the circuit of FIG. 25 will be explained.

The cache data read from the data memory 13 is held in the intermediate buffer 85 one clock delayed, and then sent to the ECC check/correct circuit 101 and the multiplexer 102 in the next cycle. In the process, the circuit 103 has not received any error correction signal (CORE_ERR), and therefore causes the multiplexer 102 to select the data from the intermediate buffer 85 and sends the cache data to the reader 91.

The circuit 101, upon detection of a correctable error as the result of ECC check, sends the error correction signal (CORE_ERR) to the circuit 103. Also, the data is corrected and the corrected data is sent to the core buffer 104.

The circuit 103, upon receipt of the error correction signal, sends the cancel signal to the reader 91 in the same cycle, and notifies the reader 91 to cancel the data being sent. With the next clock, the select signal (MPX_SEL) is sent to the multiplexer 102. As a result, the corrected data held in the core buffer 104 is output to the reader 91.

Figure 28:
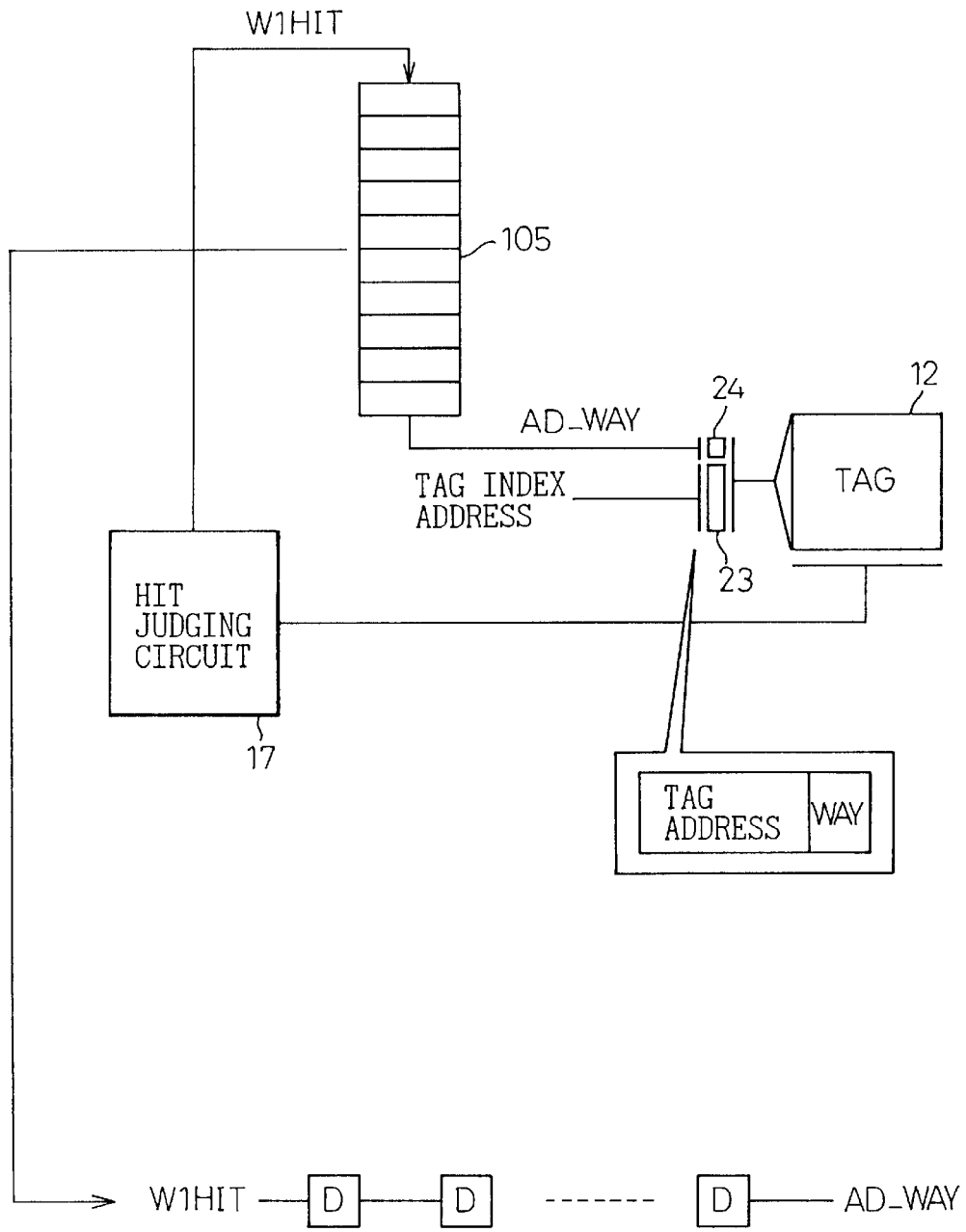
FIG. 28 shows a first configuration of the circuit for predicting a hit in the cache control apparatus according to the invention.
Figure 29:
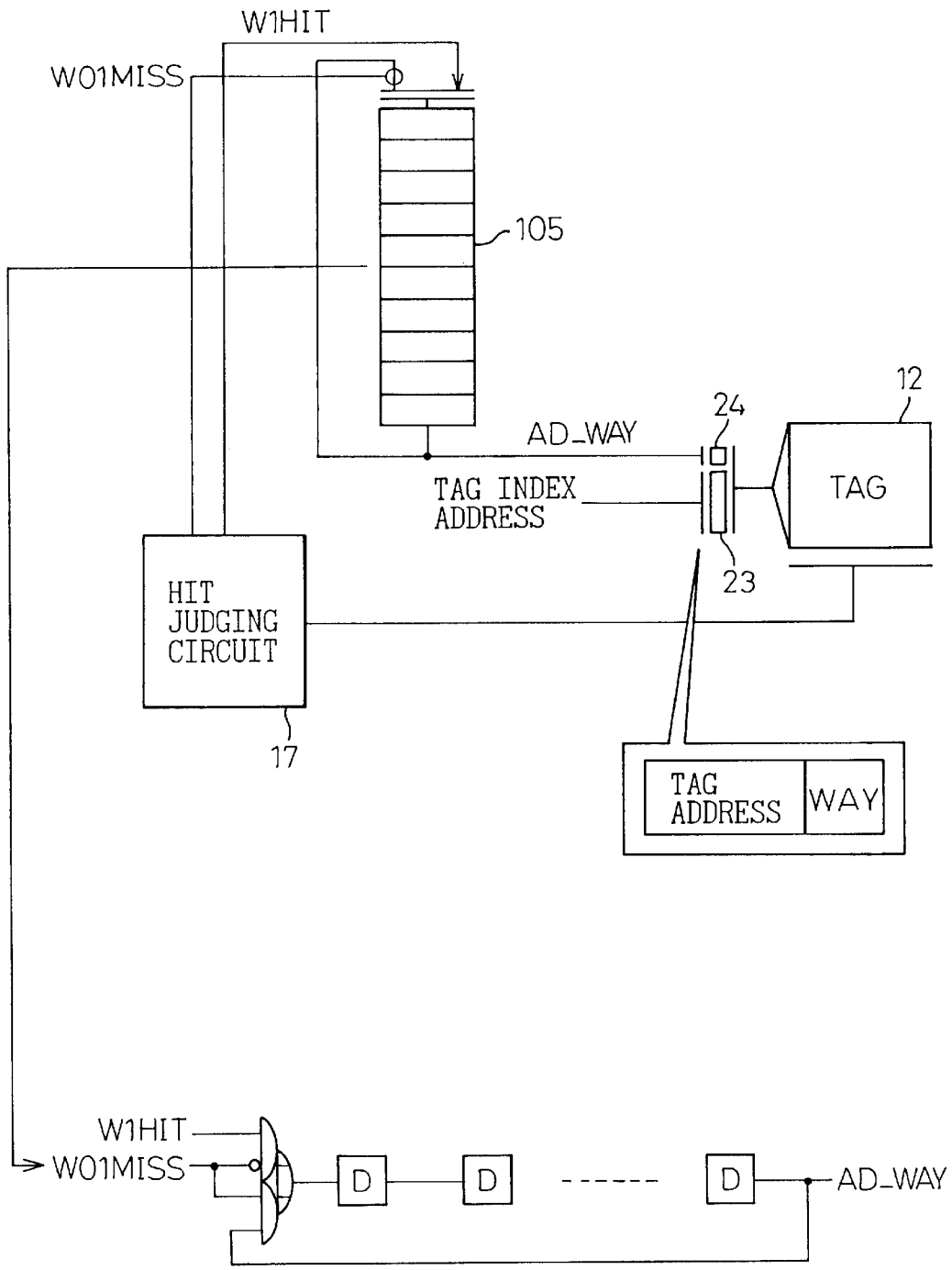
FIG. 29 shows a second configuration of the circuit for predicting a hit in the cache control apparatus according to the invention.
Figure 30:
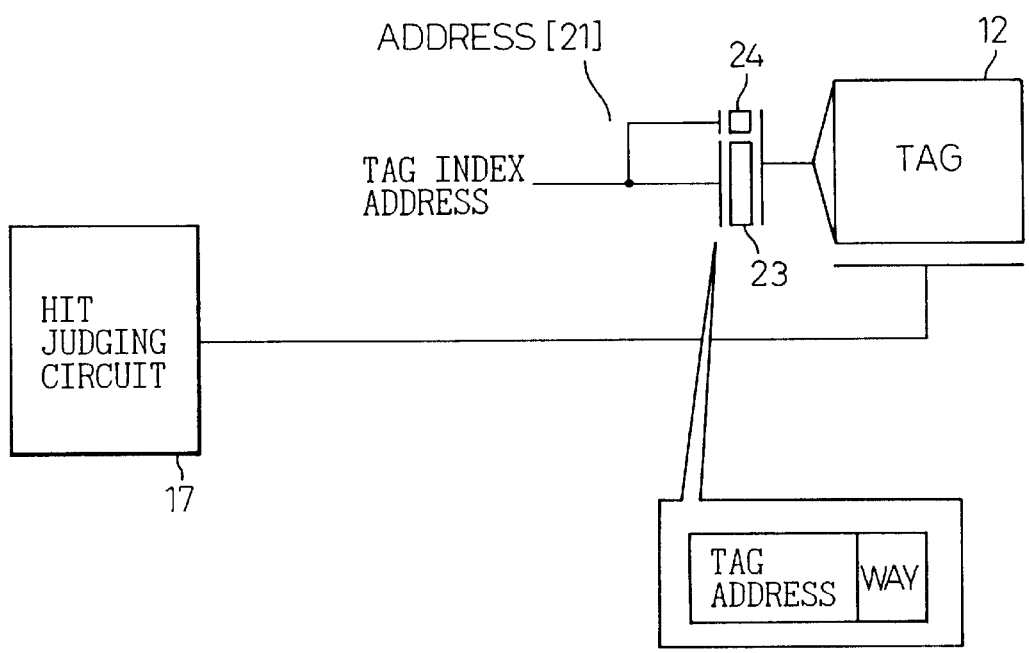
FIG. 30 shows a third configuration of the circuit for predicting a hit in the cache control apparatus according to the invention.

With reference to FIGS. 28 to 30, the hit prediction will be explained.

In the examples described above, the replacement algorithm is implemented in such a manner that the continuity of the address is detected and the replacement way is determined by a register, so that when the access address undergoes a discrete change, the replacement buffer is inverted. As a result, a series of accesses are registered together on the same way of the cache. According to this algorithm, the series of accesses are liable to hit the way hit by the immediately preceding access. Thus, the way hit by the immediately preceding access is recorded in a register, and the way designated by the particular register is first subjected to hit judgment while at the same time generating a data response signal.

FIG. 28 shows an example of improving the probability of hitting a way by recording the history of the ways hit by the past accesses.

A FIFO history storage means is provided, into which the history of the ways subjected to hit judgment by the hit judge circuit 17 are sequentially written. In this storage means 105, "1" is recorded when WAY 1 is judged as hit, and "0" in other cases (WAY 0 is hit). Thus, the past history of the ways hit is recorded in the FIFO history storage means 105 in an amount corresponding to a predetermined number N of accesses. This history is sequentially read in the next access group and output from the switch 22 to the tag memory 12.

In this case, the way of the cache tag is determined according to the past history, and therefore the probability of cache hit is improved for a shorter access time.

FIG. 29 shows an example including means to address the case in which all the ways are missed in FIG. 28 described above.

A signal W1HIT with WAY 1 hit and signal W01MISS with all the ways (0 and 1) missed are output from the hit judging circuit 17. With the signal W1HIT and the signal W01MISS, the predicted ways are recorded in the FIFO history storage means 105. In other words, in the FIFO history storage means 105, WAY 1 is stored when WAY 1 hits, and WAY 0 is stored when WAY 0 hits, unless all the ways are missed, and in the case where all the ways are missed, AD_WAY stored as the history of the immediately preceding access group is stored without using the output of the hit judging unit 17.

FIG. 30 shows the case of a 2-WAY cache using the address bit 21 (least significant bit) of the tag index address or the tag update address. In this case, the way address is selected at random when indexing or updating the tag.

According to this invention, there is provided an information processing system having a cache memory of a plurality of ways, employing a cache control method in which a multiplicity of ways can be provided without increasing the hardware amount.

Also, according to this invention, there is provided an information processing system having a cache memory with a plurality of ways, employing a cache control method in which a high-speed access time is guaranteed and even in the case where the last way is hit or missed, a response is sent with minimum delay.

What is claimed is:

1. A cache control apparatus for an information processing system having a cache memory of a plurality of ways for cache data, comprising:

a recording circuit recording a history of an immediately preceding way hit, if all the ways are missed; and a predicting circuit predicting a way to be hit from said history and responding to a cache data accessor with the cache data of said predicted way.

2. A cache control apparatus for an information processing system having a cache memory of a plurality of ways for cache data, comprising:

a recording circuit recording a part of a cache index address as a way hit and recording a history of the ways hit;

a predicting circuit predicting a way to be hit from said history and responding to a cache data accessor with the cache data of said predicted way.

3. A cache control apparatus for an information processing system having a cache memory with a plurality of ways, wherein a cache tag memory and a cache data memory are indexed with an index and a way of the cache as an address, and wherein, when the cache is accessed, each way is indexed by time division, and when the cache tag and the cache data are updated, the way to be updated is designated thereby to update the cache tag and the cache data, said apparatus comprising:

a buffer for recording for each way the data of the cache tag indexed by time division;

a judging circuit for making a hit judgment of the cache tag recorded in said buffer; and a control circuit for holding the cache tag data of all the ways until said data is recorded in said buffer, and causing said judging circuit to make a hit judgment for all the ways at the same time.

4. A cache control apparatus according to claim 3, further comprising:

a buffer for recording the information on the ways to be replaced in the case where all the ways are missed; and a buffer control unit for indexing each way, and in the process of sequential hit judgment, judging a replacement way by a replacement algorithm thereby to record the information of said way in said buffer.

5. A cache control apparatus for an information processing apparatus having a cache memory with a plurality of ways, wherein a cache tag memory and a cache data memory are indexed with an index and a way of the cache as an address, and wherein when the cache is accessed, each way is indexed by time division, and in the case where the cache tag and the cache data are updated, the way to be updated is designated thereby to update the cache tag and the cache data, said apparatus comprising:

judging circuit for judging a hit of the cache tag data; and a control circuit for causing said judge circuit to judge a hit each time of indexing the cache tag data indexed by time division.

6. A cache control apparatus according to claim 5, further comprising:

a buffer for recording the information on the ways to be replaced in the case where all the ways are missed; and a buffer control unit for indexing each way, and in the process of sequential hit judgment, judging a replacement way by a replacement algorithm thereby to record the information of said way in said buffer.

7. A cache control apparatus for an information processing system having a cache memory with a plurality of ways, wherein a cache tag memory storing cache tag data and a cache data memory storing cache data are indexed with an index and a way of the cache as an address, and wherein when the cache is accessed, each way is indexed by time division, and in the case where the cache tag and the cache data are updated, the way to be updated is designated thereby to update the cache tag and the cache data, said apparatus comprising:

a judging circuit making a hit judgment on the cache tag data as a way hit;

a data buffer holding the cache tag data;

a circuit recording information identifying each way of the cache tag data held in said data buffer; and a buffer control circuit controlling storage of the tag data of all the ways in said data buffer before completing the hit judgment by said hit judging circuit and controlling storage of the tag data of a missed way in a data area of missed ways of said data buffer after completing the hit judgment by said hit judging circuit.

8. The cache control apparatus according to claim 7, wherein if said judging circuit judges that all the ways are missed, said buffer control circuit controls storage of the tag data to be replaced in said data buffer according to the tag data of the missed ways data area.

9. A cache control apparatus comprising a circuit for responding with cache data to an accessor and a circuit for notifying the cancellation of said response, wherein the cache tag indexing and the cache data memory indexing are carried out at the same time, a cache data response is prepared before determining a hit judgment, and said cancel signal is produced when determining a cache miss, said apparatus further comprising:

a circuit for responding always with the cache data in a fixed way; and a signal generating circuit for producing said cancel signal when the missing of said fixed way is determined, and the data of said way is sent as a repeated response to said accessor in the case where another way is hit.

10. A cache control apparatus according to claim 8,
wherein said cache data is protected by an error check code;
the apparatus further comprises a circuit for preparing a cache data response before an error is determined by said error check code, producing a cancel signal when an error is determined, and in the case of a correctable error, sending a response again after complete data correction.

11. A processor cache controller having a cache tag memory and a cache data memory with ways, wherein the cache tag memory and the cache data memory are indexed with an index and each way of the cache data memory as an address, comprising:

a controller indexing each way by time division during the cache data access and updating the cache tag and the cache data by designating the way to be updated;

a buffer recording the cache tag data of each way at the indexing;

a judging circuit making a hit judgment of the cache tag data recorded in the buffer; and a control circuit holding the cache tag data of all the ways until the cache tag data is recorded in the buffer, and causing the judging circuit to make a hit judgment for all the ways at the same time.

* * * * *

UNITED STATES PATENT AND TRADEMARK OFFICE
CERTIFICATE OF CORRECTION

PATENT NO. : 6,681,294 B1
DATED : January 20, 2004
INVENTOR(S) : Shinya Kato et al.

It is certified that error appears in the above-identified patent and that said Letters Patent is hereby corrected as shown below:

<u>Column 13,</u>
Line 1, change "claim 8" to -- claim 9 --.

Signed and Sealed this

Sixteenth Day of March, 2004

JON W. DUDAS
*Acting Director of the United States Patent and Trademark Office*